United States Patent [19]
Schulze

[11] Patent Number: 4,995,025
[45] Date of Patent: Feb. 19, 1991

[54] SPHERICAL PIVOTING ACTUATOR FOR READ/RECORD HEAD

[76] Inventor: Dieter M. Schulze, 18956 Sara Park Cir., Saratoga, Calif. 95070

[21] Appl. No.: 274,217

[22] Filed: Nov. 18, 1988

Related U.S. Application Data

[63] Continuation-in-part of Ser. No. 274,217, Nov. 18, 1988, which is a continuation-in-part of Ser. No. 104,727, Oct. 2, 1987, abandoned, which is a continuation-in-part of Ser. No. 916,743, Oct. 6, 1986, abandoned.

[51] Int. Cl.⁵ .................................... G11B 17/22
[52] U.S. Cl. ...................... 369/32; 369/44.14; 369/44.15; 369/272; 360/104; 360/106; 350/3.65
[58] Field of Search ............ 369/32, 44, 112, 114, 369/176, 272, 280; 360/104, 105, 106, 107, 109; 350/3.65

[56] References Cited
U.S. PATENT DOCUMENTS

| | | |
|---|---|---|
| 3,883,216 | 5/1975 | Lee ................... 350/3.65 |
| 4,024,392 | 5/1977 | Teppo et al. ........... 250/216 |
| 4,719,614 | 1/1988 | Leterme et al. ......... 369/112 |
| 4,863,225 | 9/1989 | Howard ................ 350/3.65 |

Primary Examiner—William M. Shoop, Jr.
Assistant Examiner—Brian K. Young

[57] ABSTRACT

A low cost, low power, lightweight, low audible noise, high speed actuator for a read and/or record implement or portion thereof attached in a structure with a free end which is movable in multiple directions about essentially a single point of a pivot. In close proximity, the free end preferably moves along a mostly stationary, partially spherical media having its center point at said single point. An actuator can be devised with very low inertia whereby most of the read and/or record implements are attached to a support. Also, focus and/or tracking implements could be essentially stationary in respect to said structure so that the actuator may require only one member to be movable with only one contact point coupling said structure and support. Possible no conventional flex lead may be required. Optionally, precision of focus and/or tracking implements may be enhanced by translation.

111 Claims, 12 Drawing Sheets

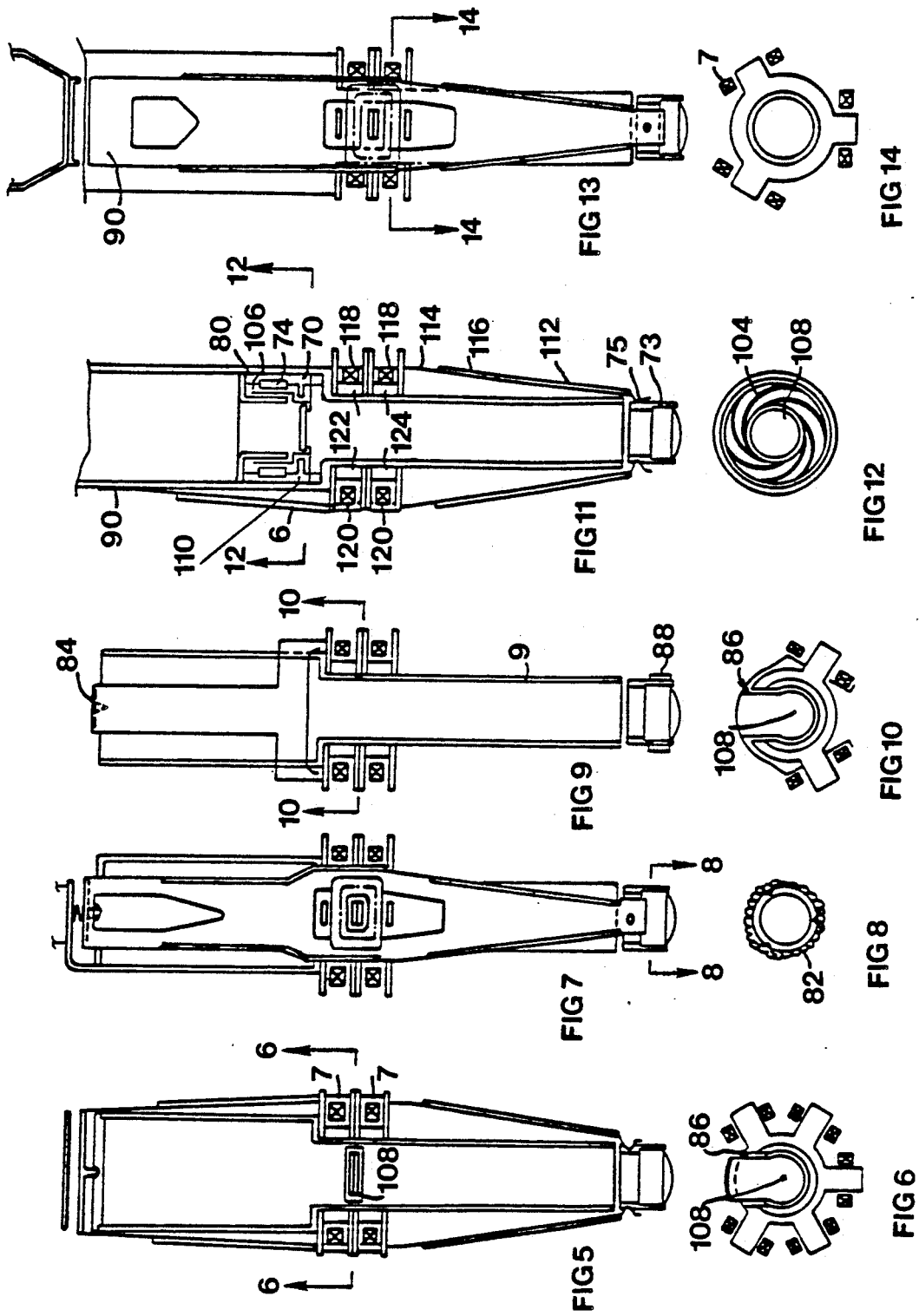

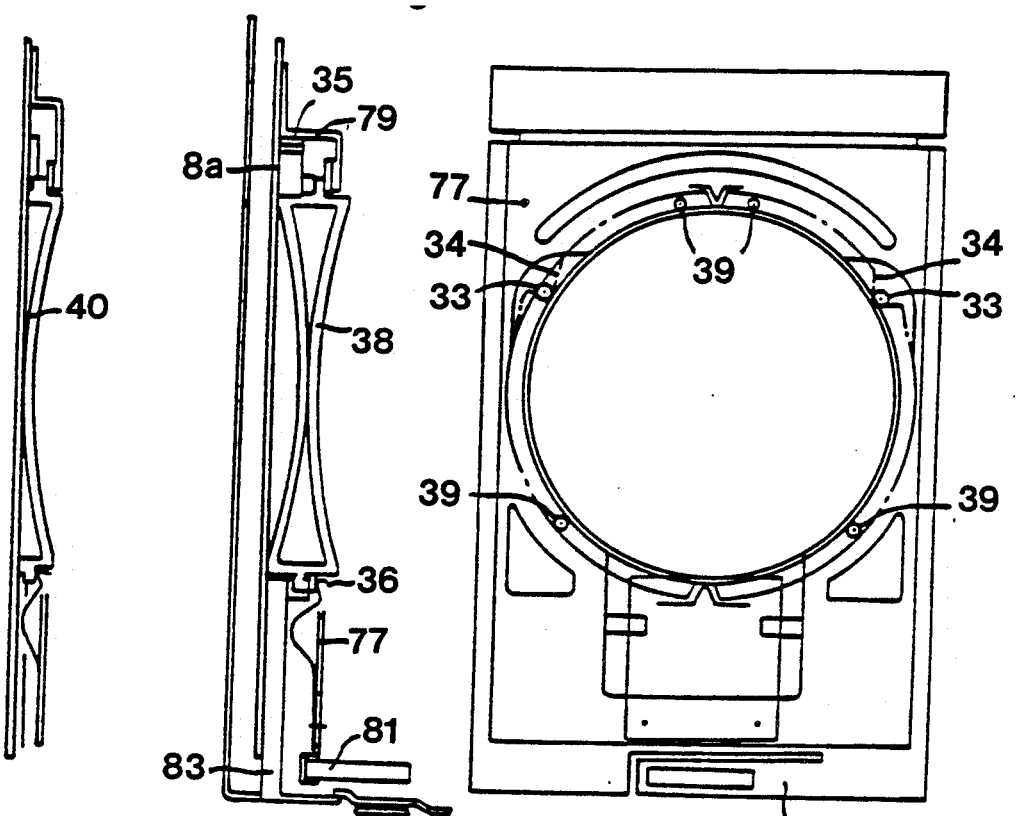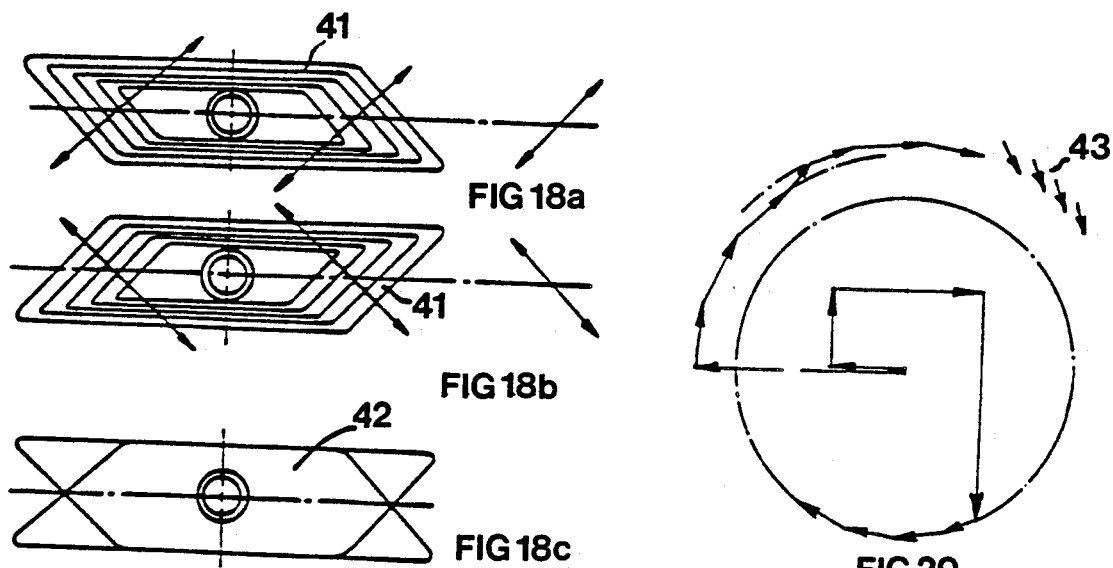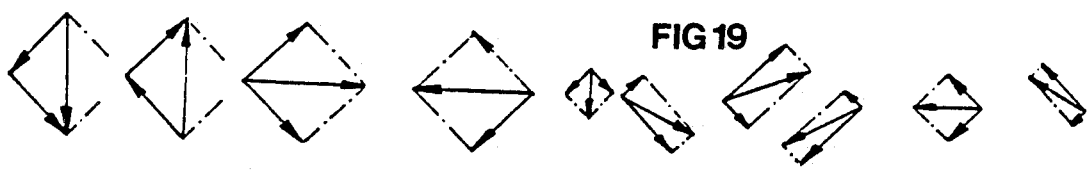

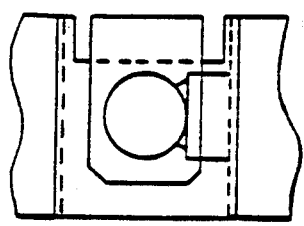
FIG 21
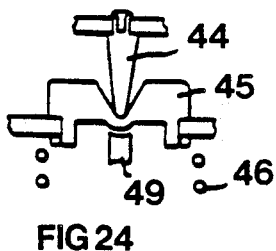
FIG 24
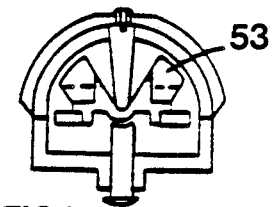
FIG 25
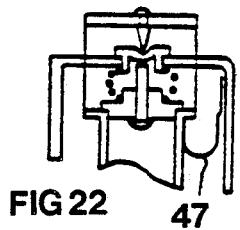
FIG 22
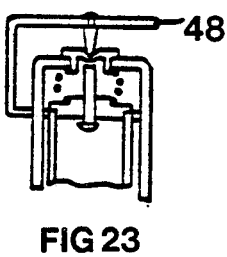
FIG 23
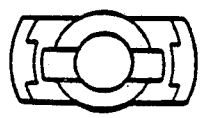
FIG 26
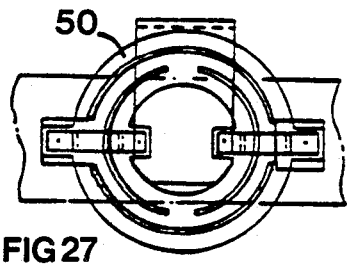
FIG 27
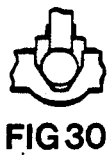
FIG 30
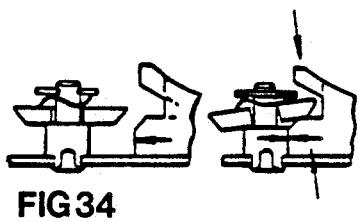
FIG 34
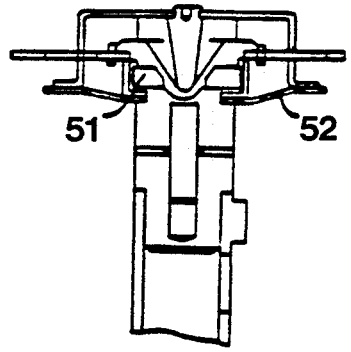
FIG 28
FIG 31
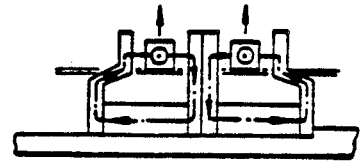
FIG 35
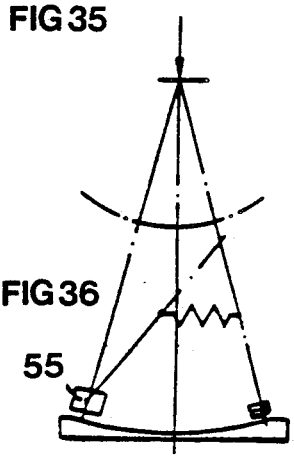
FIG 36
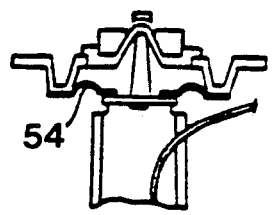
FIG 29
FIG 33
FIG 32
FIG 37

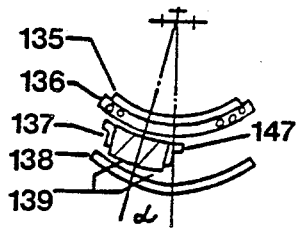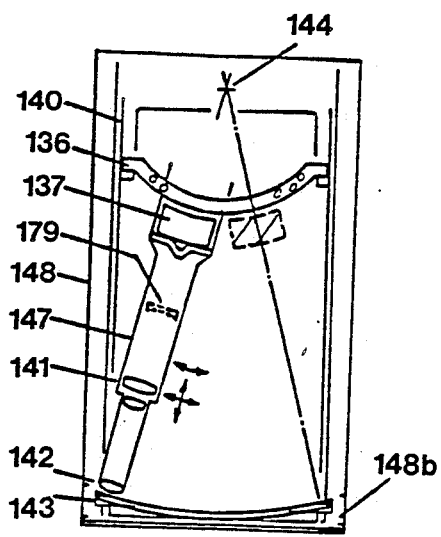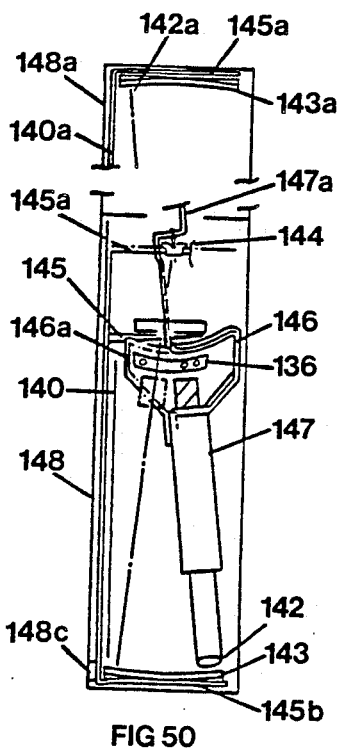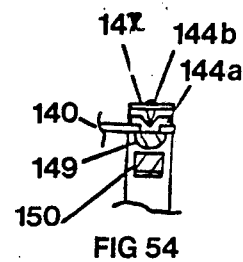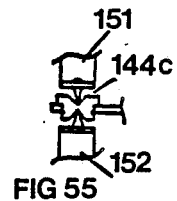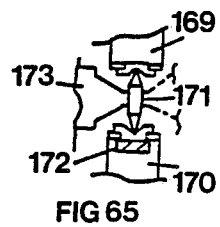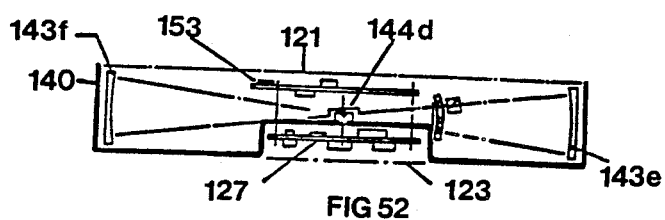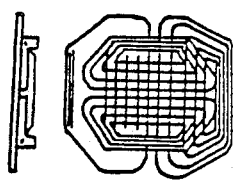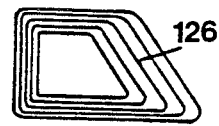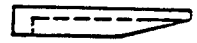

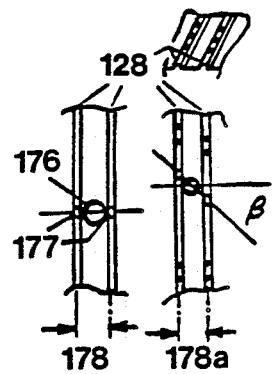
FIG 67
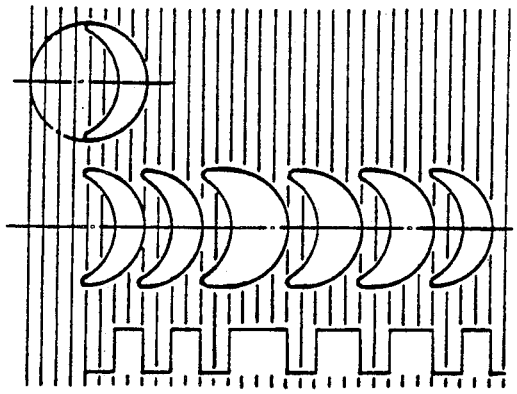
FIG 68
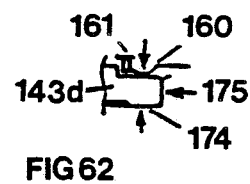
FIG 62
FIG 56
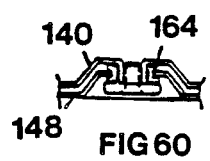
FIG 60
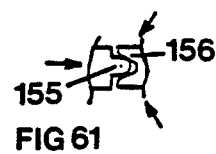
FIG 61
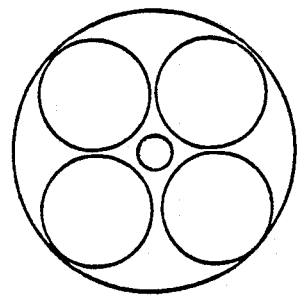
FIG 64
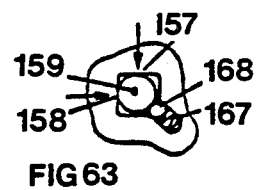
FIG 63
FIG 57
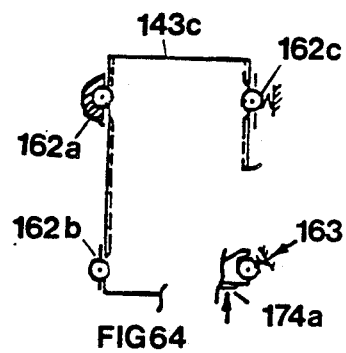
FIG 71
FIG 70
FIG 69
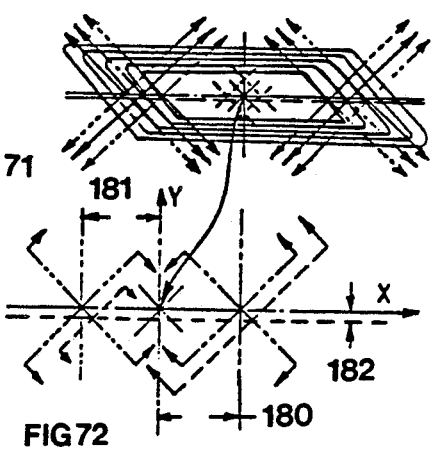
FIG 72

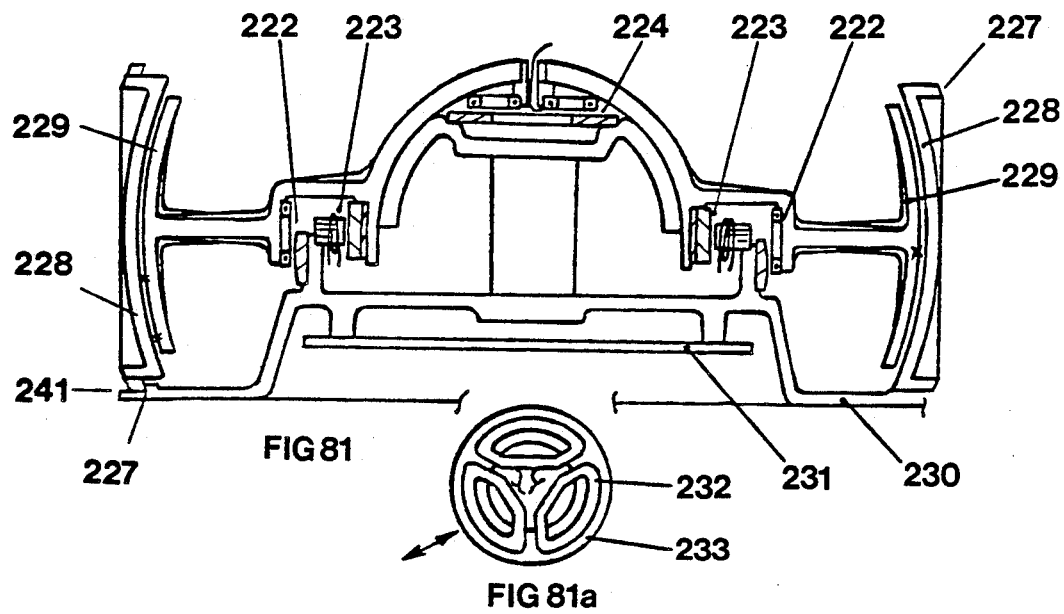
FIG 81
FIG 81a
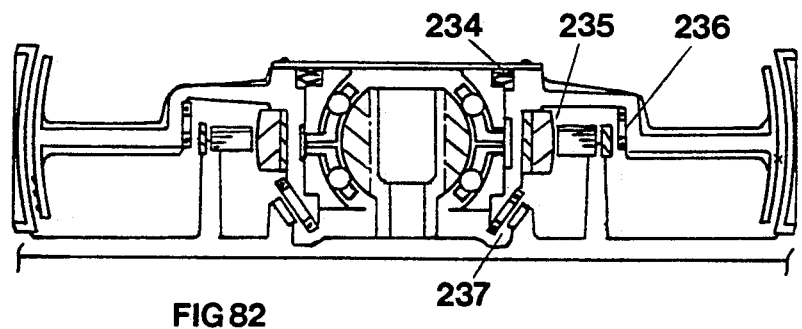
FIG 82
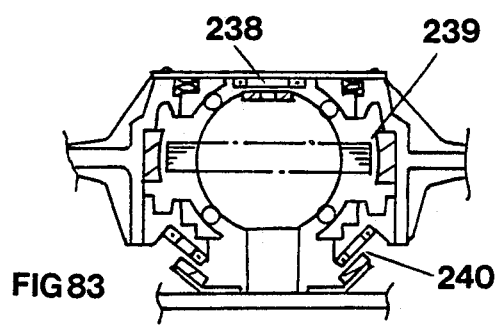
FIG 83

SPHERICAL PIVOTING ACTUATOR FOR READ/RECORD HEAD

This is a continuation-in-part of a patent application entitled "SPHERICAL PIVOTING ACTUATOR FOR READ/RECORD HEAD", Ser. No. 274,217 filed Nov. 18, 1988, which was a continuation-in-part of Ser. No. 104,727 filed Oct. 2, 1987, now abandoned, which was a continuation-in-part of a patent application entitled "SWIVEL ACTUATOR SYSTEM", Ser. No. 916,743 filed Oct. 6, 1986, now abandoned.

BACKGROUND OF THE INVENTION

The present invention relates primarily to systems for moving a read and/or record means across media, and in particular, to systems for moving an optical head or portions thereof across a media.

Most read/record heads today are used with either a disk or a magnetic tape. For disk drives, a magnetic media in the shape of a phonograph record is spun at high speeds while an actuator arm is swung across the media in the manner of a phonograph record arm. Typically, these heads will pivot on an arm about an axis parallel to the axis of rotation of the media and outside the perimeter of the media. Some head actuators use a linear movement to cross the spinning media.

Optical disk drives are constructed in a similar manner, the optical head does not need to be positioned as close to the media surface. For tape players, the tape itself is rolled past a stationary head.

SUMMARY OF THE INVENTION

The present invention is an actuator system for a read/record head. The head is mounted in a low inertia structure which is movable in multiple directions around a pivot point. The head is mounted to an end of the structure with a free end.

The actuator system is preferably used in essence with a mostly stationary media which has a curved surface with the shape of a portion of a sphere with the center of the sphere preferably being the pivot point of the actuator. The head is preferably an optical head with an objective lens mounted at the end of an elongate actuator arm structure which pivots around the pivot point. The remaining optical components and the emitter and detector of the optical system are mounted farther up on the structure so that their weight is closer to the pivot point to reduce the inertia of the actuator arm.

A beam control element is coupled via an optional plurality of straight extensions to voice coils which are mounted farther up the actuator arm. Voice coils are used for focus and possibly tracking control by moving the beam control element. This positioning of the voice coils places their weight closer to the pivot point, thus reducing their inertia. The reduced inertia allows faster movement of the actuator arm with less power.

In addition, the straight extensions coupling the focus and tracking voice coil to the beam control element angle inwardly from the voice coil to the beam control element. Thus, a large movement of the voice coil will produce only a small movement of the beam control element, enabling more precise control of the objective lens.

The actuator arm is moved with an actuator coil which attaches to the arm nearer the pivot point and is curved so that all points on the coil are essentially an equal distance from the pivot point. For certain configurations, however, this may not be necessary. Some cantilevering may prove useful. This allows the coil to pass between magnets, which are similarly shaped, no matter where the actuator arm moves to. The projection of the actuator coil onto a plane normal to the axis of the actuator arm is preferably a parallelogram, with the corners of the parallelogram having angles of 45° and 135°, respectively. This ensures that force vectors will be generated at an angle, giving orthogonal components which allow the generation of a force in any desired direction by appropriate activation of the coils or possibly magnets. Certain applications utilize a permanent magnet mounted on the arm structure.

The media itself has a curved surface with a shape corresponding to a portion of a sphere having the pivot point preferably as the center of the sphere. The media can be either circular or rectangular in shape and could optionally be mounted or integrated into a plastic card or other means. The cell spacing of individual bits on the media could be uniform, and need not be varied as for disks which have a different speed at the center of the disk compared to the periphery of the disk. However, cell spacing may also be different for timing purposes.

The actuator of the present invention significantly reduces the number of moving parts necessary.

Mostly, the need for a motor to rotate the media as in prior art is eliminated as well as the heat generated by such a motor. In addition, the variations in the distance between the media and the head are reduced thereby reducing the amount of focus correction necessary. The shaping of the media as a curved surface increases the structural strength of the media and its resistance to bending. Another implementation spins around an air or ball bearing pivot.

For a fuller understanding of the nature and advantages of the invention, reference should be made to the ensuing detailed description taken in conjunction with the accompanying drawings.

BRIEF DESCRIPTION OF THE DRAWINGS

FIG. 5 is a cross-sectional view showing one embodiment of FIG. 1;

FIG. 6 is a top sectional view of the embodiment of FIG. 5 along lines 6—6;

FIG. 7 is a side view of the embodiment of FIG. 1 showing the pivot function and a (1-COS) element front view;

FIG. 8 is a top sectional view of the embodiment of FIG. 7 along lines 8—8 showing the three alignment elements interfacing with the optional objective lens system retainer;

FIG. 9 is a side sectional view of an actuator arm showing the pivoting arrangement for the track-following and offset deflection means with the suspension for the deflection plate;

FIG. 10 is a top sectional view along lines 10—10 of FIG. 9 showing the deflection plate and the two X-Y voice coils;

FIG. 11 is a side sectional view of an actuator arm showing the (1-COS) elements with the track-following and offset deflection means suspended by a gimbal and voice coil arrangement for track-following;

FIG. 12 is a bottom view of the embodiment of FIG. 11 showing a gimbal arrangement for deflection means;

FIG. 13 is a side view of FIG. 11 showing the front view of a (1-COS) element and the junction to the housing stem;

FIG. 14 is a top sectional view along lines 14—14 of FIG. 13 showing the arrangement of the three voice coils of the X Y Z alignment means;

FIG. 15 is a top view of a clamping means for a round media;

FIG. 16 is a side view of FIG. 15 with a double-sided round media inserted;

FIG. 17 is the view of FIG. 16 with a one-sided media inserted;

FIGS. 18a-c show two individual planar voice coils in FIGS. 18a and 18b which are combined into a voice coil assembly as illustrated in FIG. 18c;

FIG. 19 shows a variety of possible forces which can be generated from the force components of the two coils of FIGS. 18a and 18b;

FIG. 20 shows some linear, circular and circular track offset movements which can be generated from the force components of the two coils of FIGS. 18a and 18b;

FIG. 21 is a top view of the pivot arrangement of FIG. 22;

FIG. 22 is a side view of a pivot arrangement, spring loaded from the bottom, pivot dead-stop and anti-rotation means;

FIG. 23 is an optional structural pivot arrangement;

FIG. 24 is a side sectional view showing a pivot pin to retainer cup interface;

FIG. 25 is a side sectional view showing a pivot arrangement with a magnet to load the pivot and also to provide some rotation prevention means;

FIG. 26 is a top view of the embodiment of FIG. 25 showing the magnet and the permeable pivot shell or another magnet;

FIG. 27 is a top view of the pivot arrangement of of FIG. 28;

FIG. 28 is a front view of a gimballed pivot arrangement including a dead-stop and a pivot load magnet ring 51;

FIG. 29 is a front view of a pivot arrangement which has the pivot loaded from the bottom and utilizes a flexible bellows ring to prevent rotation of the pivot;

FIG. 30 is a side sectional view of a pin to retainer interface for use with higher inertias;

FIG. 31 is a side sectional view of a pin to retainer interface with a small pin tip and small relative motion;

FIG. 32 is a side sectional view of a pivot arrangement similar to the embodiment of FIG. 29 except that it is loaded from the top by a magnet ring;

FIG. 33 is a side sectional view of a pivot pin to retainer cup interface with only small roll-off motion but essentially no relative motion;

FIG. 34 is a side sectional view of an individual clamping means with media interface for registration in both vertical and horizontal directions;

FIG. 35 is a side sectional view of a portion of the voice coil showing the (1-COS) elements;

FIG. 36 is a schematic diagram showing the principle of counter-mass balancing for a rotary drive;

FIG. 37 is a schematic diagram showing the movement of the objective lens with several vertically displaced voice coils coupled together;

FIG. 49 is a view of the system showing a stationary voice coil and a movable magnet arrangement;

FIG. 50 is a side view of the system of FIG. 49;

FIG. 51 is another view similar to FIG. 50 but shows the mover means on opposite side of free end;

FIG. 52 is a side view of a system with two free ends and support structure is also housing means;

FIG. 53 is another view of the voice coil and magnet arrangement of the system showing a varying air gap for balance and preload purposes;

FIGS. 54 and 55 are views of embodiments of the pivot means of the system;

FIG. 56 shows a segmented media;

FIG. 57 shows a segmented media in a rotary arrangement;

FIG. 58 shows a voice coil of a particular embodiment;

FIG. 59 is a side view of the voice coil of FIG. 58;

FIG. 60 shows another embodiment of a pivot means of the system primarily used for suspension to housing means;

FIG. 61 shows a registration means for the media;

FIG. 62 shows another embodiment of the registration means;

FIG. 63 is a centering type pivot means;

FIG. 64 is an example of registration means used for the system, insertion and/or removal may be in same direction;

FIG. 65 is a dual pin arrangement of the pivot means;

FIG. 66 shows a combination of two individual coils for one layer and a combination into a dual layer coil arrangement;

FIG. 67 shows two different track pitches;

FIG. 68 shows crescent shaped features or pits;

FIG. 69 is a side view of FIG. 70 showing a magnet, yoke and an overlay of two essentially cylindrical voice coils;

FIG. 70 is a side view of FIG. 69 and shows two flux paths, one is optional.

FIG. 71 shows offsets due to tolerances for a voice coil arrangement;

FIG. 72 shows coil offsets for elimination of rotation about mover axis;

FIGS. 81 and 81a show an air bearing implementation with flat laminations for full turn mover;

FIG. 82 shows a full turn version with ball bearing pivot;

FIG. 83 shows a full turn mover integrated with a ball bearing pivot;

DESCRIPTION OF THE PREFERRED EMBODIMENTS

Figure 1:
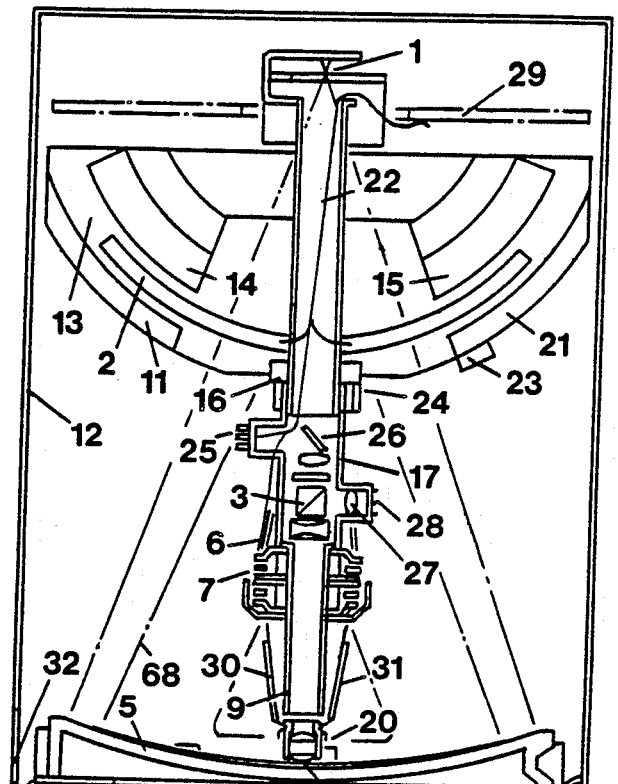
FIG. 1 is a front sectional view of an embodiment of a pivoting actuator system according to the present invention.
Figure 3:
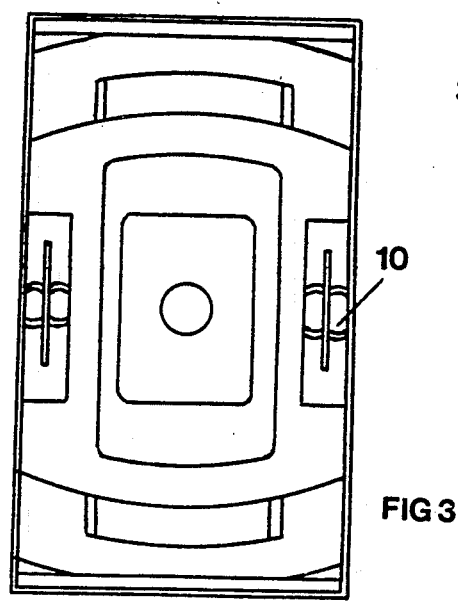
FIG. 3 is a top view of the embodiment of FIG. 1.
Figure 4:
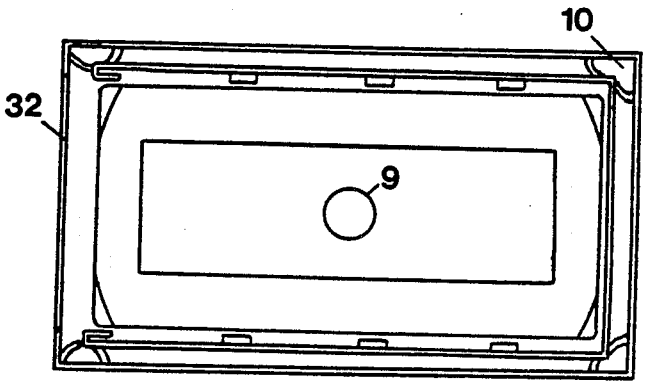
FIG. 4 is a top view of the embodiment of FIG. 1.

FIG. 1 is a side sectional view of an actuator system according to the present invention. A pivoting actuator arm 17 moves about a pivot point 1. A first, free end 20 of the actuator arm is directly above a spherical media surface 5.

Actuator arm 17 is moved with an actuator coil 2 which is integrated with and potted optionally with fiberglass to the actuator arm.

FIG. 18a shows a cross-sectional view of one section of the coils which is in the shape of a parallelogram. For terminology, active portion of coil shall mean contributing to force generation in conjunction with magnet or second coil which establishes a magnetic field. The other section is shown in FIG. 18b, with the combination illustrated in FIG. 18c. Coil 2 is passed between magnet 14 and yoke 11 on one side and magnet 15 and yoke 21 on another side. The yokes provide a permeable return path for the magnetic flux. Magnet 14 is reversed with respect to magnet 15 so that additive forces are generated in coil 2. These magnets can be electromagnets or any other type of magnet. Because the coil is preferably shaped as a parallelogram with the portions passing between the magnets being at a 45° angle, force components in any direction can be generated by appropriate activation of voice coils. Force components are shown in FIG. 19. A shading tube 9, is shown in FIGS. 1 and 9.

In principle, other prime mover means could be used, such as pneumatic, hydraulic, piezo-electric means besides others.

At least one coil extending only on one side of arm with at least one force generating segment is feasible, X and Y directions for force exertion can be favored by changing the 45° angle. Any type of read/record head can be used in actuator arm 17. Besides conventional focus and tracking means, another choice could be electro-optics.

An optical head with an objective lens 4 is shown, which focuses a beam from a laser diode 25, which is reflected off a mirror 26. The beam then passes through other optical components until it is focused by objective lens 4 on to media surfaces 5. The return beam is deflected by a beam splitter 3 through a lens 27 to a photo-detector 28 and laser diode 25, (1-COS) voice coils 7 and prime mover voice coil 2 are combined into a Kapton Flat cable 22 leading through the center of actuator arm 17 or outside arm 17 towards pivot 1. Near the pivot, flex motion is small and only a small service loop is required to couple to a printed circuit board 29 containing the control circuitry. Also connected to actuator arm 17 are three voice coils 7 which are coupled via straight extensions 30 and 31 to objective lens 4, here beam control element. Three voice coils are included to allow movement of the objective lens in three directions, the X, Y and Z directions. As can be seen, extensions 30 and 31 angle inward from voice coils 7 to objective lens 4 so that a large movement of the voice coils produces a small movement of the objective lens. This allows increased accuracy in the movement of the objective lens. The relative amount of movement of the objective lens to the voice coil is essentially a (1-COS) function.

Except for objective lens 4, the remainder of the optical elements are preferably mounted higher up on the actuator arm to reduce the inertia of their weight. The closer these elements can be mounted to pivot point 1, the less inertia they will cause, and thus the less power is required to move the actuator arm. The same principle applies to voice coils 7, which are mounted up away from end 20 of the actuator arm to lower their inertia. For low inertia, the optical components would be mounted right next to the pivot above the actuator coils 2. Different technologies, combinations thereof and implementation for the read and/or record means can be applied.

The media 5 can be inserted through an opening 32 in the wall of housing 12.

Actuator arm 17 is stationed on opposite side of opening 32 when the optical media is inserted or removed. A magnetic latch 23 with a shallow field and a permeable slug 24 on arm 17 could also be used. Prime mover voice coil 2 would pull arm 17 off latch 23 into the data area of the media. When current is applied to coil 2, such as by a switch activated by opening a drive door across opening 32, the coil will pull arm 17 up against latch 23. A media protective enclosure could also be employed for insertion and removal. Enclosure could be partial.

Figure 2:
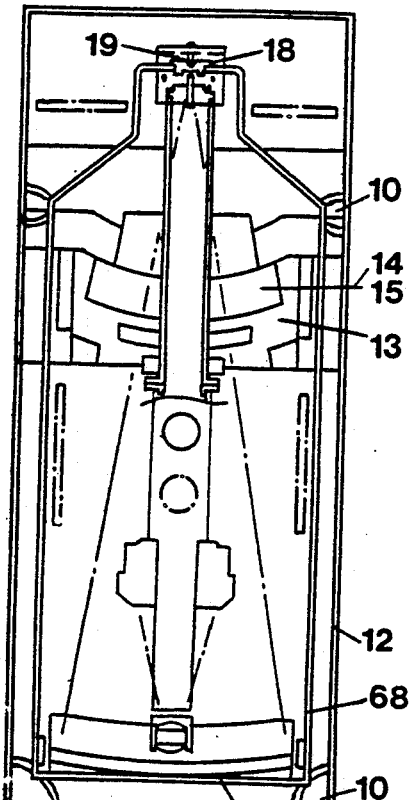
FIG. 2 is a side sectional view of the embodiment of FIG. 1.

As can be seen from FIG. 2, an internal frame 68 supports media tray 8 as well as the entire pivot arm assembly. Magnets 14, 15 and yokes 11, 21 are mounted to the exterior housing 12. Frame 68 is separated from exterior housing 12 with shockabsorbers 10. A significant separation between interior frame 68 and exterior housing 12 is provided to allow isolation from large shocks as sway space for maximum displace space. A relatively large air gap 13 is used to accommodate large excursions.

To keep the weight low and also establish adequate magneto-motive force for the long air-gap, a Neodymium-Iron-Boron magnetic material was used. Since the mass to be isolated, structure 17, is small, only relatively small excursions will be experienced. Other magnetic materials could be used. For proper operation, the polarity of the two magnet halves has to be uneven, plus on one side, minus on the other. The permeable portion of the magnetic loop can be permeable material such as iron coated against corrosion. This portion has to be separable for insertion of the stem and voice coil. To achieve shorter current rise times, copper rings may be employed encircling the magnetic flux path. This common practice may also be applied for the X, Y and Z voice coils in the voice coil deflection means 6.

For weight reduction, cobalt iron with a saturation level of about 23,500 gauss could be used.

The X, Y and Z alignment of the objective lens is implemented by a three-part translation means with essentially a (1-COS) function. Track-following is performed by the same means and/or by a tilting optical deflection assembly operated by a two or more voice coil arrangement or other suitable means with gimballed or pivoted suspension. For X and Y alignment alone, only two mover means would be required.

The system typically omits the conventional spindle and other costly carriage parts of the prior art.

Although there are other possible applications, such as printers, characters readers, tape drives, scanners and others, the description will focus primarily on optical storage and retrieval systems. The system can be applied to all optical technologies, such as OROM, WORM and Erasable. The media may be removable or fixed.

For practical considerations, there is only one area of potential wear which is the swivel or pivot assembly. However, even in circular or spiral motion, only essentially rolling movement, rather than turning motion with its relative contact displacement of surfaces, exists.

For certain applications, a pivot as in FIG. 30 or 31 with minute relative motion and perhaps lubrication may have to be used.

The flex-leads 22 are proven in existing products for long life. The X, Y and Z alignment and deflection means 6 experience only very slight bending stress to assure almost infinite life.

A pivot retainer cup 18 shown in FIG. 2 can be manufactured with ultra-high molecular weight, high density polyethylene with two to six million molecular weight or a dense high temperature polyimide or other suitable means including other plastics. Those materials can be filled with graphite for permanent lubrication to maintain low friction. The high inherent damping of these materials will suppress mechanical vibrations. The dead band for servo operation is low. The system has very low audible noise. Porous phosphor bronze is another choice. A pivot pin 19 can be coated with hard nickel to assure low friction and good wear characteristics. 300 series stainless steel may be a choice. Other materials are possible and, if needed, very long life lubricating means are in existence. Wear augmentation of said cup, if needed for higher inertias and speeds, can also be accomplished by densification techniques such as compression of plastics at contact point. The cup of FIG. 30 could extend into a cylinder of limited length. Striations and/or porosity of material may enhance lubrication distribution. Wear-in protrusions can be devised precluding lateral shifting of pin in reference to cup. Cup assemblies may include a lubrication reservoir.

The media can be of various shapes and different utilizations. The data surface will be spherical, with or without grooves for positioning, timing and data information. Grooves could employ more than one level with or without surface inclinations. The position information should preferably be permanent. However, servoing of data is a possibility. Position information may consist of arrangements of discernible features or pits from regular data related pits. Position information may also include timing information, a location could be grooves or lands, if used, where data information could be placed as well.

Throughput speed improvement may be achieved by writing and/or reading data in opposite directions among tracks. Spherical media integrity is high. Flat media, by comparison, can be bent so that sensitive layers could be subjected to tensile or compressive forces degrading grain structure and other functional properties. Sensitive layers, such as seed layers or layers for phase change or magneto-optic media are examples. The media can have a round shape. For certain applications, operation may preferably be in circular or spiral fashion and constant linear speed. To avoid excessive rotational speed, the inner diameter should not go below a certain minimum. The remaining area, unlike for conventional flat round disks, can be utilized for data also. The spherical shape of the media provides some surface protection since the concavity provides a recess against a flat surface. In circular operation, like hard magnetic disk drives, constant angular velocity is used sacrificing some data capacity. For certain applications, transfer-frequency changes for different zones or gradual changes can be applied for increasing data capacity. Varying of bit cell lengths may ease operation.

The media can also be rectangular, either square or oblong or any shape. Square and particularly oblong media could be used where maximum capacity is desired but being constrained by a mandatory footprint to be compatible with existing drives. The motion can be back and forth. The moves would have short acceleration or deceleration ramps before achieving or after leaving plateau speed.

It is also noted that for nutating and/or back and forth motions, the reversal of direction happens at an instant of zero speed which is favorable condition in order to control and/or maintain track position. The media can be of different size, perhaps up to a practical limit. A penny or a silver dollar size could prove useful, for example, where a so-called optical card or a CD-ROM is to be used. If, however, an optical card with about credit card size is used, several spherical indentations could be placed on both sides, front and back of the card in symmetrical and/or offset fashion as to upper and lower surface for higher capacity.

Offsets may keep sagittal heights low. Particularly if the size of a penny or silver dollar was used, the use of a metal substrate for certain technologies may be indicated. This would allow well proven and extremely low cost coining manufacturing methods. For highest demands, low expansion Invar as a substrate could be used. Especially for nonremovable applications, glass or Cervit with a coefficient of thermal expansion of half a micro inch per degree Fahrenheit could satisfy the most demanding applications. Surfaces could also be lapped.

Since the media in essence are mostly stationary, only a very small amount of vibrations will be transmitted. Furthermore, no heat source is placed under the media, assuring stable conditions. Smaller media are easier to process, transport and store. Higher yields and less defects can be expected.

Thermal expansion and/or contraction may be alleviated by stress relaxation means including recess and/or cutouts on the periphery and/or center of active part of media.

The media could have at least one recess or a bottom hole for registration.

If the registration of the media maintains a constant distance from the pivot to any location of the data surface of the media, any lateral or more exactly spherical offset, typically small, will not change the focus requirement of the system.

Also, if the three registration contact points are individually movable, in the same context, such alignment plus movement in the focus direction can be accomplished, thus largely reducing otherwise required focus range of free end.

However, such movement can also be accomplished by movement of the entire pivot in focus direction, as does simultaneous movement of said three points. Said movement can also be applied to clear free end to avoid contact when media gets inserted or removed.

The motion towards the free end is limited by stop means establishing definite location in relationship to pivot allowing media insertion/removal with free end moving.

An enclosure can be used to improve portability. Enclosure may have means to clean or keep the media clean. The corners of the enclosure can be devised to withstand hard impact. The parts count is very low in comparison to conventional drives. The drive spindles, with electronics, costly drivers, bigger power supply, test, assembly and storage are eliminated. The carriage equivalent is greatly simplified. Tight tolerances are avoided. Parts are typically small. Large cost savings are realized. A disk drive by comparison has many more parts, which for the same storage capacity requires a larger envelope, more power, perhaps clean room assembly techniques, and precise assembly alignment procedures. More than one actuator could be accommodated into the same housing. Here, more than one actuator could also be accommodated with the same frame or tray means which could either be commonly rigid or individually movable to each other.

There are many applications where the drive is accessing only a few sectors with a very low duty cycle.

Particularly here, a movement in at least one direction would prove very favorable. At idling times, the actuator will rest at some location on the media. Very minute current is required. To emphasize speed, one has to realize that many positions, a hundred or more, can be accessed from the same major track by merely tilting the highly responsive mirror 3 or other equivalent functional means. Overall, power is very small, and the controlling electronics could also go in standby mode, reducing power even further. Operation may be with internal battery and/or photovoltaic cells on the housing in certain instances. One application is for data collection in remote areas. Typically, lowly utilized home computers may fall under this category. Circular or spiral motion, however, would use much less peak power than a hard disk drive. In a hard disk drive, the time to attain rotational speed has to be very short because heads are in contact with the disk. Gliding time on disk should be short to avoid damage. After gliding, the heads will fly and are separated from the media as in optical disk drives, where, however, the distance is much larger in the order of about one half to one millimeter, using reasonable optics means, versus about one eighths to a quarter of a micrometer for hard disk drives. For this reason, the optical drive will need much less peak power even for circular motion. Running power is only a small fraction of starting power in hard disk drives. Only a little more than running power is needed for this optical drive.

The principle of the present invention has high upward mobility to apply the higher areal densities and technologies of the future. Since the media, in essence, is mostly stationary and no heat source is in close proximity, the functional behavior will be very stable. The actuator principle also eliminates many conventional vibration sources. The pivot has very high inherent damping, almost isolating the moving parts from the tray structure. Vibrations play a key role for ultraprecise and responsive positioning. The media being in essence mostly stationary will also allow the use of the most stable glass substrates. The inventions merits will improve with higher areal bit densities of the future.

Since the focus requirements of the pivot actuator versus conventional optical drives are reduced by a factor of perhaps 10 to 20, electro optical means become very viable. See U.S. Pat. No. 4,564,267, Nishimoto, "Variable Focal Length Lens", U.S. Pat. No. 4,445,209, Mickleson, "Dithered Focusing Systems", U.S. Pat. No. 4,322,837, Mickleson, "Dithered Center Tracking System". Other contemporary means are public domain. This means that there is no physical movement relative to the pivoting arm, the structure with the free end. Here, focus and tilt or tracking means are not movable. The operational movement is now the arm versus frame via pivot. The arrangement can be devised for high dynamic stability with excellent frequency characteristics for highest precision positioning.

Figure 39:
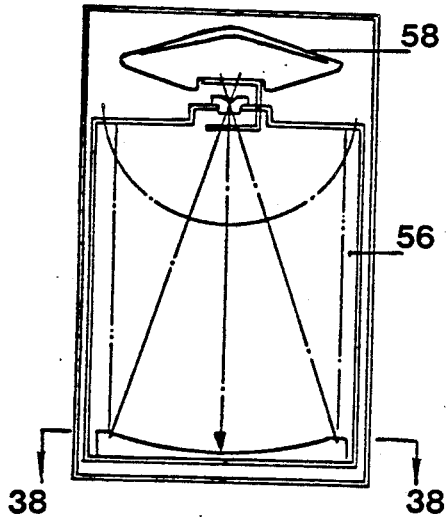
FIG. 39 is a front sectional view of an actuator system using a balance weight on top of the pivot for portable applications.

Neglecting the flex-lead assembly, as in FIGS. 1, 39, and 49, which is about half stationary in operation, a functioning unit may have essentially only one movable member particularly when electro-optical means are used for focus, tracking and/or track addressing.

Figure 79:
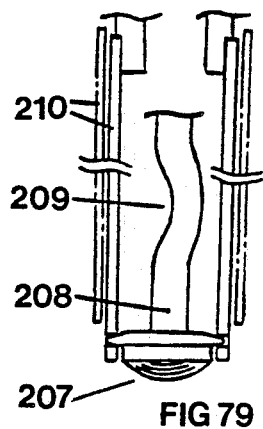
FIG. 79 shows objective lens means integrated with fiberoptic strand actuated by piezo-electric means.

FIG. 79, shows a low inertia objective lens means 207 integrated with optical fiber 208 with a small bend-loop 209 to allow focus and/or tracking implemented with piezo-electric material columns 210 or other suitable shapes, in principle facilitating the functions, enabling an extremely low inertia structure with free end.

For terminology, tracking shall also mean accessing of ambient tracks.

The deflection means for the tilting function could be implemented in a similar fashion. Electrical calibration can be utilized and wider tolerances are another advantage.

A multitude of rectangular, round or any shape of media and/or sizes can be projected.

For certain applications, an actuator can be devised where the actual voice coil extends only on one side of the structure allowing sideways insertion into the magnetic circuit.

The principle of the present invention has very favorable functional features to serve highest areal densities of the future. If beam steering perhaps with surface emitting lasers and/or integrated heads become a commercial viability, no physical movement for tracking and focus is required.

For reference, see U.S. Pat. No. 4,801,184 from Revelli "Integrated Optical Read/Write Head And Apparatus Incorporating Same". Since potentially there is only one element moving, the structure with the free end, the vibration sources are at minimum. This allows very small features for highest areal bit densities to be implemented. All existing and future anticipated optical technologies, besides x-ray, ion beams, electron beams and similar means can be applied to the current invention. The next generations of optical storage may be visible lasers, frequency domain, photon-gating or multiple color lasers besides others. A harmonic generator could considerably multiply bit densities in the future. The optical card for identification is a WORM-application. Every identification is different and individual imaging is required. One use may be medical records. The planar card can also be used for erasable media. Detachable, round or penny type media could be shifted in a card type magazine, like barrel shifting to defined contiguous locations. It remains to be seen whether a small round media instead of the optical card will prove to be more practical and popular. Since very high areal bit densities are predicted for the future, the pivot actuator could be used in combination with a media of a relatively limited surface area which could be flat, cylindrical or also curved.

In order to specify both cylindrical and flat surfaces the term 'a surface with at least one straight linear line' will denote either surface.

The term 'curved' shall mean spherical, cylindrical or a special curve primarily used with bendable pivots. Besides the surface shape definitions the term media shall denote a means for storage and retrieval of data, a term as coined by the industry. Media shall construe a single segment, multiple segments, one sided, dual sided, at least one sided, dual sided with same centers, dual sided with offset centers, fixed in structure, removable from structure for example from planar card, fixed in drive, removable from drive.

The media could be protected by an enclosure which could also serve as registration and/or insertion means.

Multimedia shall construe media used for retrieval and/or storage of video, sound, speech, animation and computer processing data, on one individual media, separate media or combinations thereof. Different technologies such as 'Read Only' like CD-ROMS, write once read many (WORM) and different types of erasable could, for example, be utilized with same media, as well as intelligence, RAM, ROM logic circuits, display/keyboard, and others. These features, but not limited to, shall be referred to as multifunctional.

A multifunctional head, which is capable to serve one or more such technologies, could be devised, or the same media can be utilized in different units or systems which have those head technologies individually. To gain perspective on average access time, it has to be considered that much shorter strokes are required in the present invention for the same amount of data as recorded on magnetic discs because of higher areal densities. The excursion clearance of the tray structure to the housing can be observed in FIGS. 1, 2, 3 and 4. A stop means 16 is provided to soften impact of arm on overtravel should the system be out of control.

An opening 32 in the housing for insertion and removal of the media is provided. A second opening will be provided if the media insertion and removal is in the same direction. Partial insertion as well as sequential insertion/removal can be accommodated. An optical card could, for example, only be inserted on one corner requiring a very small read/record unit only. A card or strip can be inserted/removed in sequential fashion, either through two openings in the housing or continuous openings on three sides.

The media can also be devised for stackability. Interfacing recesses and projections, or lug and recess, will prevent sideways movement when media are placed, for example, on each other for storage.

FIG. 11 shows an embodiment of the X, Y and Z direction alignment means with the (1-COS) elements. A deflection means 70, for track-following or offset, is also shown. A glass plate, a grating, or other suitable optical means 108 is suspended from the actuator arm structure by way of a gimbal 104. The gimbal can also be cylindrical, mounted on top of the voice coil arrangement. Stop means 110 limit the plate excursion upon excessive shock. Plate 108 also preferably connects to at least one element voice coil arrangement 106 which can facilitate track-following and track to track movement for circular, spiral, linear, or any movement. A magnet ring of Neodymium-Iron-Boron, or other suitable material for magnet 74 and the permeable loop element 80, preferably cobalt iron for low weight, comprise the magnetic circuit. The magnetic circuit can be devised for magnetization of ring in axial or radial direction. The upper part 6 of the (1-COS) elements are spot-welded, or joined with other suitable joining means, at position 90, also shown in FIG. 13, to the actuator arm housing. The material may be stainless steel or beryllium copper or other suitable materials. The (1-COS) elements are moved with voice coils 118, 120 and magnets 122, 124.

FIG. 35 explains the function of the magnetic circuit for the (1-COS) element. One of the magnet rings and special washers could be eliminated, however, the force constant would be cut in half. Returning to FIG. 11, the lower extension 112 of the (1-COS) element is connected to the objective lens system optional retainer 73 by pivot arrangements 75 loaded by a circular spring 82 or other suitable means of joining. Lower extension 112 includes a flat member 114 and a reinforcement wedge 116. Wedge 116 adds stiffness to structure 112. All three of elements 73, 75, 82 comprise a system which performs the X, Y and Z direction alignment. This same system can also provide small offsets in the X-direction lateral to track by tilting. Track following can also be facilitated with this system, up to a point.

FIGS. 5, 6, 7, 8 and 9 show essentially the same element, except that the interface to the stem is implemented by a pivot allowing a wider operating range since the spring of (1-COS) element is longer.

Another way would be to permanently attach the pivot point to the actuator arm, or stem by resistance welding or similar techniques and by extending the spring portion 6 to the top portion of the actuator arm close to the pivot. The deflection means, in its function similar to the conventional mirror tilt, of FIG. 9 is suspended by a pivot 84 mounted into a cup formed by the permanent pivot of the (1-COS) elements. Plate 108 of the deflection means shown in FIG. 10 is inserted into the optical path through an opening 86 in the stem housing. This deflection means is devised to operate with the same magnet ring or rings as the X, Y and Z alignment means. A mover as in FIG. 48 could be used. The voice coils are stationary on the stem and a plunger of a small magnet or permeable material transmits the force to the (1-COS) element. The system may also operate against biasing springs in one or both directions. The biasing means could also be implemented with a high damping means. A center position with essentially no bias can also be utilized.

Damping means could be employed in critical areas of the stem system besides the shock isolation and stop means for the drive. If the magneto-optic recording technique is used, an erase coil 88 as shown in FIG. 9 might be attached to the objective or pick-up lens optional retainer. However, overwrite and/or direct overwrite could eliminate the erase coil.

FIG. 15 shows the top view of a clamping means for round media. Initially, a clamp lever 77 is lifted by a spring 79, see FIG. 16, backing against the excenter means 81 which is also in the unloaded position.

An insertion means 83, gets inserted with the media. Said insertion means may be omitted and another media may aid insertion/removal. The guided retainer in turn gets inserted through an opening of the housing onto the tray with the registration pins 33 for X and Y alignment of the media. Appropriate recesses 34 in the media extension ring engage with the registration means, here pins 33. One pin to media interface establishes a fixed axis, another pin prevents rotation. Registration means 33 can be implemented with coined projections on the tray. These projections could also serve as registration means if fixed, in contrast to removable media, are used. Since the enclosure has adequate clearance, it will float, except for an extraction spring 35 which will hold it against the media.

Once the media is engaged with the registration means, the excenter 81 will force the clamping lever downwards against the tray 8a. A properly devised spring 36 engages with the media, forcing the media against the pins, while clamping it against the tray for control in the Z direction. Again, the constant radius registration method with relatively large lateral tolerance can be applied also.

The excenter 81 has an angular overtravel and also an overtravel spring 37 in the clamping lever in order to retain position and allow for large parts tolerances. To isolate the excenter from the drive housing, overtravel clearances in the lever coupling means in all directions are provided. A clamping and registration means to also accommodate different technologies, sizes and shapes for media can be devised with passing or clearing recesses. The media and tray will have high spots engaging the tray in the area of the engagement protrusions.

FIG. 16 is as side view of FIG. 15 and shows the application for dual-sided media 38, or media on opposite side. Also displayed are the spring-loaded engagement protrusions 39 to the media ring for clamping the media to the tray.

FIG. 17 shows a similar arrangement for single-sided media 40.

FIGS. 18a-c show individual planar voice coils 41 and the combined, superimposed overlay into a functioning unit 42. A structure passes through the center. This structure is actuator arm 17 of FIG. 1. At least the leads for the voice coils will be passed to the pivot area and be connected via flex leads to a printed circuit board, no flex lead for primary mover is required if voice coil is stationary. The amount of bending can be reduced if bending occurs in vicinity of pivot. For assembly purposes, the structure may be round, U, H or of other convenient shapes. Lightweight structures could be achieved by choice of materials including aluminum, magnesium, titanium, fiberglass and perhaps also sheet metal, magnetic or unmagnetic, and the like.

More than two layer pairs can be arranged, perhaps one more with a 90° offset, or two more with a 60° offset and so on. The voice coil assemblies can be implemented with copper or aluminum magnet wires or by multilayer processing as in thin film heads, or insulated laminates. A functioning unit of voice coils may extend on only one side of the actuator arm. This is mandatory for the arrangement of FIG. 41, but could be used for the two-sided arrangement in FIG. 18 also.

FIG. 19 shows how any force components and relative directions are generated by changing the current amplitudes of the individual coils, or operating similar to pulse width modulation. FIG. 20 shows, in particular, how linear, circular, spiral and track offsets are generated. It also shows the components 43 for circular or spiral motion once a rotational speed is attained. Here, centrifugal forces have to be contained or counteracted, depending on speed. For essentially linear back and forth motions with reversal of direction, repel forces may enhance operation. These forces may be generated by magnets of opposing polarity, indentable means like rubber with optional damping, by contacting spring means and others. Here, energy is stored into means and then returned to moving mass. Such means maybe combined with stop means.

FIGS. 21, 22 and 23 show pivot arrangements. A pin 44 with a small, round shape interfaces with a pivot or pivot retainer 45 allowing motion for degrees of freedom to describe a spherical motion of an objective lens to interface with preferably a spherical media surface.

The side view FIG. 24 shows a spring 46 loading the pivot while exerting little lateral force to keep force bias in the pivot low. Magnetic levitation means may establish a pivot movable essentially about a single point for certain applications. Focus and tracking means could also be an application for magnetic levitation and/or including superconductor means. A rotation prevention means 47 is also shown, consisting of an environmentally stable flex medium to prevent rotation. The prime mover voice coils 2 are capable of aligning the optics in the direction of the track, preventing rotation of the actuator arm about its own axis depending on symmetry. Depending on the degree of asymmetry, an additional coil generating a relatively small torque may prove useful to facilitate rotational stability or prevention of rotation. This can be done by providing the voice coil more directional current in response to a rotation detection by the optical system.

FIG. 71 shows how offsets by design can compensate for tolerances to prevent a torque or rotation about the mover axis.

FIG. 72 is enlarged and shows the relevant features of the mover center. It can be seen that either one-sided coil layers, see FIG. 58, or one or more symmetrical layer pairs, see FIG. 18, can cancel the torque by varying drive current. This is feasible when the offsets 180 and 181 are larger than the asymmetry 182 about the Y-axis in this setting. Additional balancing about the arm, perhaps by addition of a balance weight, may be desirable. Rotation, however, is desired and controlled in cases where different track-pitches for the media have to be accommodated, see FIG. 67. For perhaps smaller rotations, said rotation could also be useful for control of the alignment of the read/record means to the critical Kerr-angle in magneto-optic recording.

FIG. 23 shows a front view of the C-structure 48 connecting the upper to the lower part of pivot. The dead-stop 49 prevents the pivot pin from moving out of the pivot retainer when extremely high shock is imparted on the system. The clearance from the stop to the bottom of the retainer is only a few thousandths of an inch. For this reason, the dead-stop and the bottom of the retainer are shaped to maintain clearance in lateral operation of pivot.

FIGS. 27 and 28 show a pivot arrangement with a gimbal 50 for control against rotation of the pivot. The loading of the pivot is implemented with a magnet ring 51. The planar offset 52 of the gimbal is optional.

FIGS. 25 and 26 show a pivot arrangement whereby the loading is done by a magnet 53 which also prevents rotation. The magnet protrusions are polarized plus and minus. The assembly will settle into the position of most favorable reluctance, thus re-zeroing into this position when rotational forces try to disturb its equilibrium. The pivot can also be preloaded by means of two magnets with opposing polarity thus repelling each other and exerting force between pivot pin and pivot cup.

FIG. 29 shows a pivot which is loaded from the bottom by a magnet ring. Rotation prevention is implemented by a suitably devised circular flex ring 54. The drive can also operate upside down.

FIG. 30 shows a pivot interface to the retainer cup for heavier inertial loads. Slight relative motion occurs and outside lubrication may enhance operation. The shape of the pin tip could be used for all approaches.

FIG. 31 is also a pivot interface. Relative motion occurs, however, little since the round tip of pivot pin is small.

FIG. 32 shows a pivot arrangement similar to FIG. 29 except the loading occurs from the top. The difference may be functional and/or assembly preference.

FIG. 33 is a pivot interface showing perhaps the regular envisioned operation. No relative motion occurs, essentially only rolling motion.

The shape of the interfacing surfaces would have to be optimized for this application; lubrication may be indicated depending upon the application. Material choices for pivot pin may include 300 series stainless steel and/or hard nickel coated materials. A selectively controllable pivot preload could be employed.

FIG. 34 shows individual media clamping means for both lateral and vertical directions.

FIG. 35 shows the magnetic circuit assembly for the X, Y, Z alignment means and the generation of the forces.

FIG. 36 shows, in principle, a floating mass 55 for balancing. The placement and coupling is arbitrary, here shown to be coupled with structure with free end. Floating mass may also be coupled to support structure or also the housing or other suitable places, or combinations thereof.

FIG. 37 in principle shows an additional set of movers for the (1-COS) system. The system can now access a small flat surface considerably larger than the one set system could. Though the one set mover system, as in FIG. 11, can move laterally and also tilt the objective lens, it could not also focus the objective lens properly. Initially, smaller capacities could be accessed. In the future, when highest density techniques, like multi-color lasers, become viable, the capacity and speed become considerable.

Up to a certain size of data base, a stationary system with two sets of movers may be required only. More responsive voice coils could be employed. In the same context, the prime mover pivot could consist of a piece of bendable wire, a coil spring, including a gimbal restraint for movement in the Z-axis, a flex band having a rigid and a bendable portion as shown in the (1-COS) means, bendable in at least one direction or at least two different orthogonal directions or components thereof. Besides others, all could be used for up to a certain performance level which in turn is dependent on other factors as areal density. If a gimbal perhaps supporting said pivot and very light arm structures are used, in certain applications the entire said structure could be moved for focusing, which means alignment in the Z-axis.

A media with its interfacing surface shaped like a particular curve essentially describing the motion of the objective lens, sphere, cylinder or flat could be used.

In summation, the term pivot shall be construed as a pivot means substantially movable about a single point coupling structure with free end and support structure and allowing movement relative to each other.

Either structure is driven and controlled by a primary mover and perhaps servo feed back or other means to move in essentially at least one direction, however, said means is devised to allow movement in at least two different orthogonal directions or components thereof in at least two planes. In other words, structure can move in any direction, except the Z-direction.

Without alignment means such as for focus and X-Y, a free end of said structure is able to move along a portion of a sphere or a particular curve.

Said free ends movement is meant to include optional paths which could be linear, circular, spiral, oval, rectangular, parallelogram, triangle, spherical, cylindrical, curved and/or any combinations thereof when interfacing with a media. Said pivot means could function by itself without any other support means. Support means, however, could be used also as such. One example is a magnetic pull force which lessens the load on the pivot.

In this context, a pivot preload as for example exerted by spring 46 in FIG. 24, shall not be considered support means since it does not restrict pivots motion as such, i.e., the motion in at least two orthogonal directions as mentioned before. For certain applications, the pivot is the only means needed for a functional system for relative movement and is also distinguished from the prior art which employs movement about at least one stationary or moving axis particularly for a primary mover. This means for other than focus and/or tracking alone or perhaps linear movement and combinations of both. However, in applicants invention, two crossing or coinciding axes may also form a pivot means movable about a single pivot. The crossing of the axes may be missed by typically small manufacturing tolerances. Also, the crossing points stay substantially referenced to each other and only angular but no lateral shift along the axes occurs. A pivot allowing relative movement in two orthogonal directions or components thereof in at least two planes also allows substantially relative movement about a single point.

For clarification, a spindle axis is deemed stationary even though elements are rotating around it. Examples are: spindle, pivot of rotary actuator, helical scanning, tape recorders, drums and others for movement about a stationary axis. For linear movements: linear actuators, card readers, X-Y plotters.

The pivot means may be categorized into two classes. One class allowing angular movement about approximately a single point as in FIGS. 22, 23, 24, 25, 28, 29, 30, 31, 32, 33, 44, 45 and 46 with two contacting surfaces, a spherical ball bearing, a pivot according to FIG. 43 with air-bearing means or perhaps magnetic levitation and/or including superconductor means or the like and others.

Another class comprises the bendable pivots like a piece of wire, coil spring, flexband bendable in one direction or two orthogonal directions, the (1-COS)

means or other similar means, said flex band may be a dual flat. It may consist of two small flats which are attached to each other with the flat portions 90° apart. Typically two orthogonal directions are favored and rotation prevention means may not be required.

The bendable pivots move about some confined space and perhaps not strictly about a single point. The other configurations move about a single point within the confines of microinches.

A flex band instead of a pivot with an axis like in a rotary actuator as in the public domain would not control motion about a stationary axis due to its limited torsional rigidity. For this reason, additional support is required in order to generate motion about a stationary axis.

Figure 42:
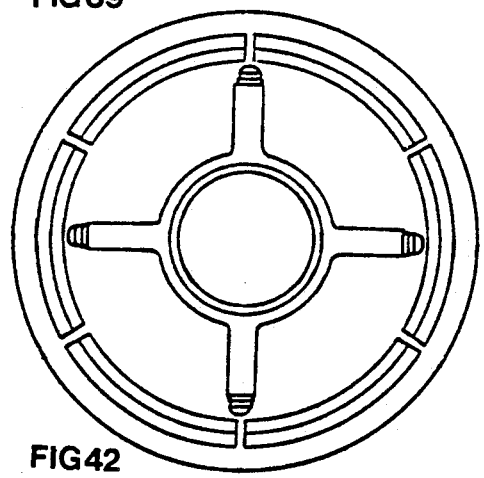
FIG. 42 is a top sectional view of the embodiment of FIG. 43 along lines 42—42 showing segmentation of the spherical media.
Figure 43:
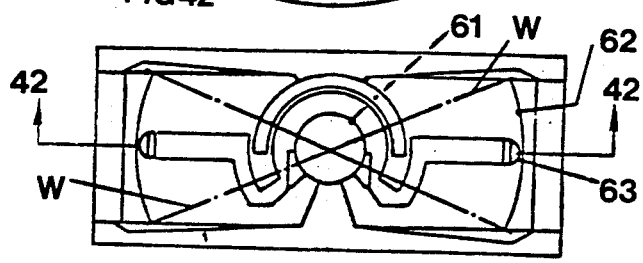
FIG. 43 is a front sectional view of a cylindrical spherical media arrangement with an air bearing pivot.

Besides being controlled in essentially at least two orthogonal directions the arm structure in applications as shown in FIGS. 42 and 43 could represent a functioning unit while moving in only one direction.

In combination with a cylindrical surface of perhaps limited length and alignment means as in prior art, a limited surface area can be accessed with high speed.

If the media, for this application, would be rotated in opposite direction of free end, an even higher access speed could be achieved. Shockabsorbers will dampen the reactive forces generated by the movement of the actuator arm structure so that smaller movements relative to the outer housing occur. This means that the media may not strictly be stationary, although only relatively small excursions occur.

Again, in order to eliminate or at least minimize reactive or induced forces on the housing 12 or also the yoke 11, it becomes obvious that a second pivot means (FIG. 60) in close proximity to first pivot coupled to the outside housing could be employed. Instead of being attached to housing as in FIG. 1, the yoke means is now attached to the tray 8 with support structure 68 and the media attached to said tray structure will move in space.

The excursion of the movement will depend on the moment of inertia relationship of said read and/or write means structure, i.e. structure with free end, and tray including media and possibly media clamping means. Typically, only a small excursion will occur, however, large excursions will provide high shock isolation.

Low inertia may be achieved by fiberoptics, periscopic coupling, electro-optics, short wavelength light and associated smaller optical components, integration of optical means, aluminum wire or voice-coil printed circuit coil, high energy product magnets, and similar means.

If said second pivot was used, the shock absorbers serve to limit and dampen the excursions due to reactive forces besides shock absorption.

Also, a unit operating on one side with one prime mover and a second perhaps opposite structure and two individual media, perhaps one removable, could prove attractive for copy-capability and portability due to its lightweight design. Balancing would essentially be accomplished by second structure if rigidly coupled to first structure.

This second structure operating with the same pivot as the first structure may, besides others, either include a longer structure without voice coil or magnet, or same structure as first including voice coil and magnet, or at least one more structure maybe such as two with or without voice coil or magnet or combinations of those.

Segmented media, for one, shall mean at least two physically detached media are accommodated by same actuator and perhaps support structure. It also means that several individual media, for example spheres, could be on the same substrate which may have essentially the shape of a partial sphere which the actuators free end describes and whose radius is larger than the individual spheres or any other shapes including a flat.

The read/write means are devised so that the individual spheres can be accessed by these means while the main mover or movable structure is substantially, but not limited to, stationary. The structure with its free end could in certain applications be stationary while the media moves.

For static balance the gravitational forces due to mass distribution have to cancel. This may be for any orientational position of apparatus or for one only. The balance weight 58, FIG. 39 may meet the requirements for example.

However, at least for a particular orientational position, static balance essentially can be achieved by configuring magnetic preload means such that, depending on actuator position, force variations can be generated to cancel said gravitational forces. For example, in a moving magnet type configuration, a change of distance from magnet to yoke means will vary force attraction of magnet, see FIG. 53.

Magnetic preload means exhibit same feature. By balancing, a force bias will be minimized or eliminated for proper servo operation.

For dynamic balance, the inertia distribution about the pivot but also about the neutral axis of the structure with its free end has to be even. The proper distribution about the pivot will reduce said force bias when shock and vibration is imparted on apparatus. The distribution about the neutral axis will essentially prevent rotation.

In order to lower lateral operational forces on the pivot, the movable portion of the means for moving should preferably be placed into the center of percussion, as one way of implementation, reference being a well known baseball bat, batters wrist to be the pivot, mover means to be the baseball.

Figure 38:
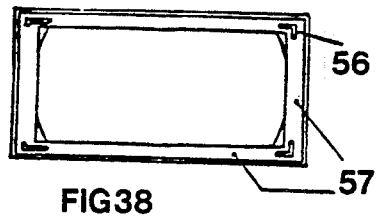
FIG. 38 is a sectional view along lines 38—38 of FIG. 39, showing the tray bracket and media.

FIG. 38 shows the bottom tray to pivot connection means 56 whereby the columns allow more overtravel 57 of the objective lens or allow a larger media surface to be placed into same footprint of a given housing. The pivot assembly is connected to the tray by columns placed in the remote corners of the drive so that the objective lens has more clearance for excursion.

FIG. 39 also shows a connection means 56 in a front view. Also shown is a balance weight 58 on top of the pivot for portable applications of the drive. The balance weight assures no change in force bias for the voice coil mover means due to gravitational forces when the unit operates upside right, upside down, on its side, or combinations thereof. Dynamic balancing can also be achieved. Static and dynamic balance are different in nature and in order to achieve both, compromises will have to be made in the placement of masses about their centers. In certain applications, these simultaneously balanced conditions are important for proper operation. One example is portable applications.

Figure 40:
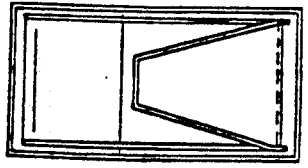
FIG. 40 is a top view of FIG. 41.
Figure 41:
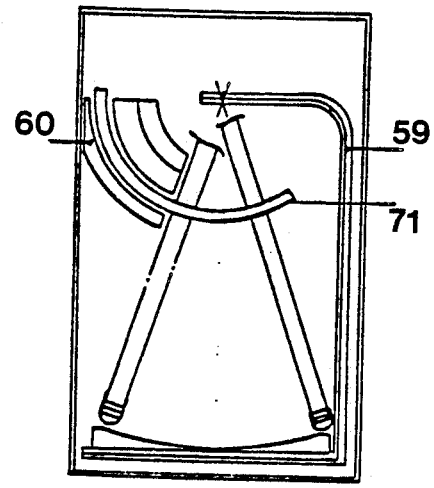
FIG. 41 is a front view of an economy version actuator system.

FIG. 40 is a top view of FIG. 41.

FIG. 41 shows a model employing a C-frame 59 support structure and a one-sided voice coil and magnet assembly 60. A C-type bracket is used. The magnetic circuit assembly is only on one side, making it smaller and less expensive. Insertion of the voice coil is simplified. A one-sided voice coil and magnet assembly could also be utilized with a frame similar to that shown in FIG. 38 and 39. A right side 71 of the voice coil may be used as a balance weight or may be omitted. One application may be Photo Chemical Hole Burning.

FIGS. 42 and 43 show another case, in principle. An air bearing, preferably a self-acting pivot 61, operates on a cylinder-like spherical media 62 with continual high-speed rotation. Parallel beams will provide higher transfer speed.

Figure 44:
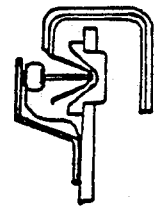
FIG. 44 is a side sectional view of a pivot showing an implementation of a pivot pin where the manufacturing technique used is deep drawing and flexible load means.

FIG. 44 shows a pivot arrangement with a deep drawn integral C-structure. The pin is loaded to the retainer via a padded needle and a load spring. The dead stop is also shown.

Figure 45:
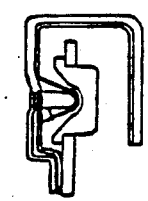
FIG. 45 is similar to the view of FIG. 44, with the load pin implemented by a flexible load means.

FIG. 45 shows a similar arrangement. The pin portion has a slant to allow for a shallower construction. A flexible means loads the pin via a spring.

Figure 46:
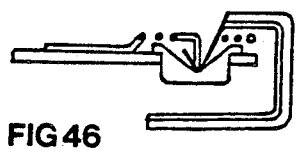
FIG. 46 is a side sectional view of FIG. 47 along lines 46—46.
Figure 47:
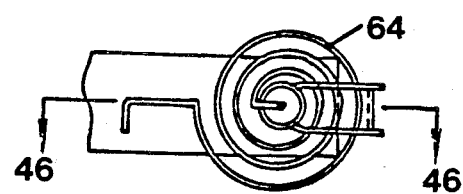
FIG. 47 is a top view of a pivot load spring with minute lateral force.

FIG. 46 is a side view of FIG. 47.

FIG. 47 shows a pivot load spring 64 which exerts only minute lateral motion.

Figure 48:
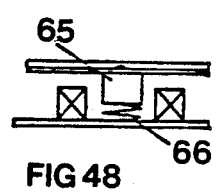
FIG. 48 is a side sectional view of a plunger type solenoid mover operating against a bias spring.

FIG. 48 shows voice coil or solenoid arrangement with a plunger 65 operating against a bias spring 66.

FIG. 49 shows a stationary voice coil 136 and a movable magnet 137 arrangement. The placement of voice coil 136 and magnet 137 along axis of structure with free end 147 may be reversed. The current rise time is typically comparatively low when either non- or less permeable means 146, 146a are employed, see FIG. 50. The coil arrangement is mounted to the support structure 140. A beam control element 141, here a lens, is located between the free end 142, here also a lens, and the magnet 137, on the here movable structure 147. Directional arrows show the potential movements of the beam control element 141. 179 shows a reflective element, being curved or also flat. Same motions as for 141 may apply. The beam control element could also consist of electronic beam steering, potentially including acousto-optics. These means are typically located closer to the media on preferably an integrated head structure on the free end. Once again, other configurations could be utilized. For terminology, a beam control element maybe the objective lens in certain applications. Media 143, whether removable or stationary, is located on the support structure 140 which in turn established essentially a fixed distance to the pivot means 144. A housing 148 also shows openings 148b for media insertion and/or removal.

FIG. 50 is essentially a side view of FIG. 49. Housing 148 shows opening 148c in the other lateral direction. However insertion from the bottom, or top if upside down, is also a possibility.

Also shown are permeable means 146 and 146a. 146 may suffice providing one flux path. 146a provides a second flux path and its optional use would also add strength to the structure with the free end, or here movable structure. The perpendicular portion of 146 may require a cutout for routing fiberoptics and/or flex cable, splitting the flux. Clearance holes accommodating the excursions may be provided in magnet and voice coil so that said fiberoptics and/or flex cable can be routed in the shortest distance to the pivot. 146a or 146 could be of non-permeable material. Voice coil 136 is mounted on strut 145 which is part of support structure 140.

Pivot 144 is mounted on strut 145a, also part of support structure. Media 143 is placed on extension 145b, part of support structure and registration means. Permeable means 146 and 146a may be attached or integral part of structure 147. Structure 147a with its free end 142a is an optional extension of structure 147 with its free end 142. Structure 147a and free end 142a operate with a second media 143a, either removable or stationary, also attached to support structure 140a or 145a.

FIG. 51 shows a configuration whereby the mover means, here voice coil and magnet, are located on the opposite side of the pivot. One reason for this location maybe balancing.

FIG. 52 also shows a configuration with two free ends and two media. The support structure 140 is also the housing with covers 121, 123 added. The pivot 144d is mounted so that structure with the free ends weight partly preloads the pivot, 127 and 153 are PC-boards.

The configurations of FIG. 50, 51 and 52 can be operated in any position preferably if they are balanced, particularly lending themselves for portable applications.

FIG. 53 shows a configuration with stationary voice coil 136 and stationary permeable means 135 and 138 which are an integral part. Magnet means 137 is suspended by structure 147 with the free end. Air gap 139 is of varying length thus changing magnet attraction force dependent on angular position. Said force is generating a clockwise torque increasing with angle $\alpha$. Structure 147 will also generate a counter clockwise torque due to gravity increasing with angle $\alpha$ preferably cancelling said clockwise torque, thus achieving a balancing effect.

FIG. 54 shows a magnetic preload means for the pivot. Magnet 149 is attached to a pivot cup 144a, and support structure 140, magnet 150 is attached to pivot pin 144b and structure with the free end 147. Polarity of magnets is such that they repel each other thus generating a preload force for the pivot. Magnets have to attract if placed on pin side of cup. As explained in FIG. 53, magnets could be devised to at least contribute to balancing.

FIG. 55 shows a dual pivot arrangement, two pivot pins operate with the same pivot cup or retainer 144c and two separate structures with free ends 151 and 152. A common dual pin and two cups could be used also, see FIG. 65.

FIG. 56 shows segmented media whereby several spheres 154 are integrated into a partial sphere of media 143b of larger radius or a planar card, or similar arrangement.

Segments maybe of any feasible shape.

FIG. 57 is essentially the same but in a rotary arrangement. Media maybe enclosed in an enclosure so that one media could be placed under a free end at a time, or two media under two free ends at a time and so on. Multiple free ends on such segmented media as well as offset means to move actuator to different segments of media are possible.

Offset means could also be utilized in the full turn version. The entire unit could be turned circumferentially and ratcheted into contiguous positions. Bypassing of some media segments is a possibility in order to provide access to certain pieces of media for insertion and/or removal. This may be of merit when the unit or the drive is integrated into a portable computer or the like in order to gain access to the particular specimen of media. The offset means will facilitate the movement of media segments in relationship to the actuator, or vice versa, from one fixed position to another.

For terminology, data surface shall be construed as the active means for retrieving and/or storing data. There may be several layers to facilitate the overall function.

FIG. 58 shows a voice coil with only one side contributing to force generation, not being a parallelogram as in FIG. 18.

FIG. 59 is a side view of FIG. 58. Active portion 126 normally contributes to force generation, however, bend up portions may also contribute by interaction with leakage flux in certain applications.

FIG. 60 shows an arrangement serving dual purposes as a shock absorber and a second pivot.

The shock absorber 164 allows spherical motion and also motion along the axis of the screw. In combination with separators 10, isolation for vibration and perhaps shock but also operating motions of media can be absorbed. Support structure 140 is coupled to housing 148 by means of shock absorber 164. The length of the threaded portion of 140 is such that a fixed distance for establishing a preload on shock absorber 164 is provided. Configuration will also be useful if no such pivot action is required. In certain instances, pivot action may require a larger excursion than isolation for vibration and shock only would. A pendulum type suspension could also accommodate for mounting misalignments of the housing and/or provide portability.

FIG. 61 shows a registration means feature whereby a spherical structure 155 interfaces with a cone shaped interface 156. A pivot as in claim 1 is established for two degrees of freedom. A similar pivot, except with a slightly elongated cone in combination with pivot of FIG. 61 will then only allow movement about one axis. Said elongation is required because of tolerances. A third contact point would be required for this configuration to constrain movement about said axis.

Registration means of FIG. 62 could serve this requirement. Contact point 174 will limit such rotation while spring force 160 will establish contact. Force 175 will establish contact for aforementioned interfaces of FIG. 61. Forces 175 and 160 may be combined into one force with a direction of perhaps 45°, if both forces are equally favored. Dead stop 161 prevents ejection or excessive excursion of media 143d when high shock is imparted on apparatus. FIG. 62 also shows an element for registration means with three contact surfaces with three transverse contact surfaces. This same principle in conjunction with the beforementioned preload and dead-stop means can be devised for a rotary actuator pivot axis. The second pivot means, spaced apart from the first over a certain distance, in particular but not limited to, may have some elongation along the axis through both individual pivot contact points for wear purposes. An almost frictionless pivot with partial turn rotation could be devised.

FIG. 63 shows a centering type pivot whereby perhaps the larger ball 159 may be part of the media engaged at contact points 157 and 158 by spring force 167 via ball 168. Contact points 157 and 158 are flat surfaces with high perpendicularity. Other contact points like 174 and spring force 160 would also be required.

FIG. 64 shows an example of registration means whereby insertion and removal in the same direction, maybe by another media, is made possible. Media 143c has three recesses 162a, 162b and 162c, two of them again a slightly elongated cone 162a, 162b and a spring load 163. Again, a surface like 174a is required.

FIG. 65 shows a dual pin 171 arrangement with support 173 interacting with two separate structures 169, 170 with free end on which individual cups are mounted. A preload magnet 172 is also shown.

FIG. 66 shows a voice coil assembly whereby two coils per layer may be utilized. As shown, only a one layer pair operating in parallel or series is required to generate orthogonal motion under perfectly aligned conditions. Rotated 45°, components of both layers are required as before.

FIG. 67 shows a possible way to accommodate two or more media with different track-pitch to operate with a same head. By rotating the axis through data feature 176 by angle $\beta$, the same sensing means of the optical head sensing the light of rails 128 can now sense a different track pitch. In this example, track pitch 178a is narrower than track pitch 178. Also shown are potential timing and/or data features 177 which may have offsets. This rotation could be used for diagnostic purposes also. Dedicated and/or controlled rotation is, however, highly desired in magneto-optic technology in view of Kerr-angle rotation.

FIG. 68 shows a set of crescent shaped features as written on data surface.

FIG. 69 is a side view of FIG. 70 showing also a magnet pair, of which one magnet assembly is optional.

FIG. 70 is a side view of FIG. 69 showing two assembled, here rectangular, cross-sectioned voice coils and a magnet assembly. A full turn application is shown in FIG. 43 utilizing a cylinder structure with a spherical surface, an air bearing pivot for high rotational speed, multiple heads, and data transmitted through short distance in air perhaps with light, micro-wave, electron-beam and others, and coupling means for data and/or power from movable to stationary structure to be devised for least relative motion.

A spinning head would be balanced by a symmetrical mass, or in the same context, opposite pairs of optical heads could be used for parallel operation. Controllable balance means can be established by placing a small mass suspended by heat wires or bi-metals on opposite sides or a small solenoid at a strategic location allowing mass shift.

Figure 74:
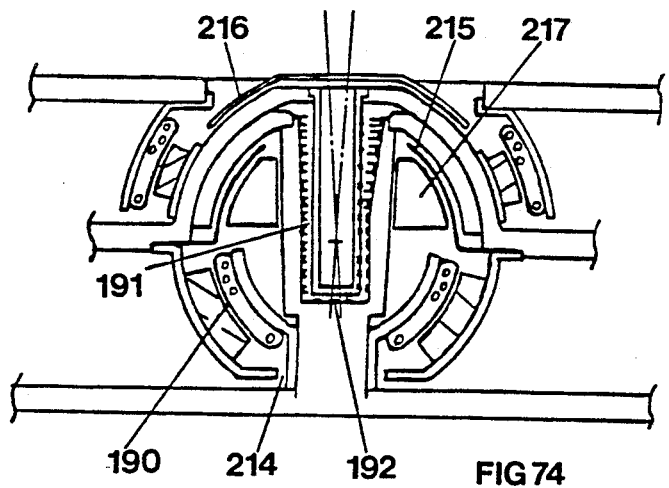
FIG. 74 shows also a halfsphere air bearing, motor for rotation and light rail configuration clustered closer to center of rotation.

FIG. 74 shows a mover means, or spinning motor 190, to allow at least a full turn rotation in at least two planes. The light rails 191 are clustered closer to center. Light rail vicinity 192 could be contact brushes if preferably placed closer to center for the direct current power supply. Inductive coupling could be used.

Figure 75:
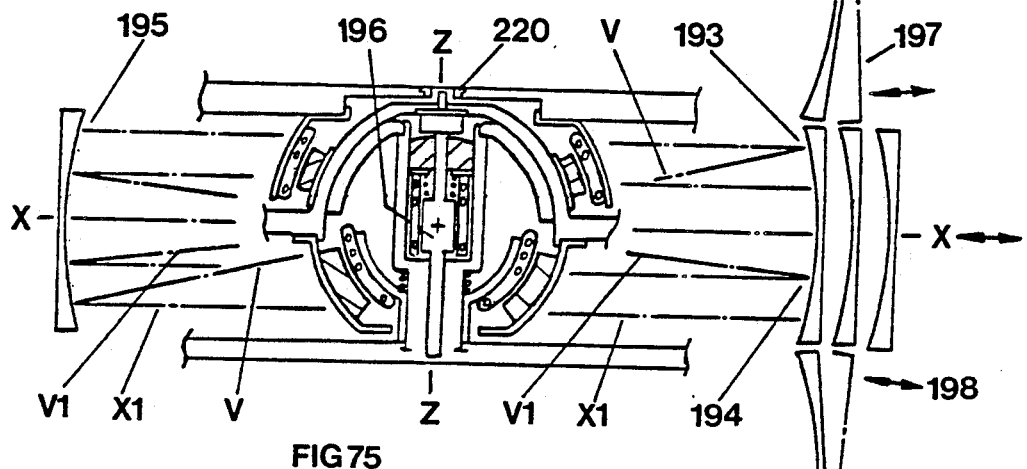
FIG. 75 shows operation of two arm pairs and a library type insertion/removal scheme for media.

FIG. 75 shows two pairs of heads 193, 194 and operating range, media 195, air bearing starting aid 196, here a solenoid, a library type insertion/removal scheme 197 which keeps orientation of media in same direction, and multiple columns. Media movements are shown enabling random operation. The numeral 198 denotes optional tilting of the media.

Figure 76:
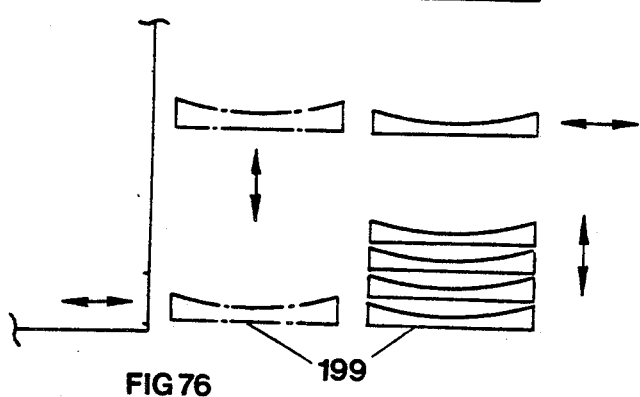
FIG. 76 shows a columnar insertion/removal scheme allowing random selection of individual media.

FIG. 76 shows insertion/removal scheme 199 including feeding of media to unit including different directions. Certain aspects like ease of handling and/or recess of data surface, besides others, provide very favorable conditions for insertion/removal and storage of media. For conventional spindles the hub tolerances, contaminants, centering of the media and the like are vastly magnified particularly for axial height control or wobble. The media for the pivot actuator is, however, registered on the periphery providing very favorable registration conditions so that also focusing requirements are greatly reduced.

Figure 73:
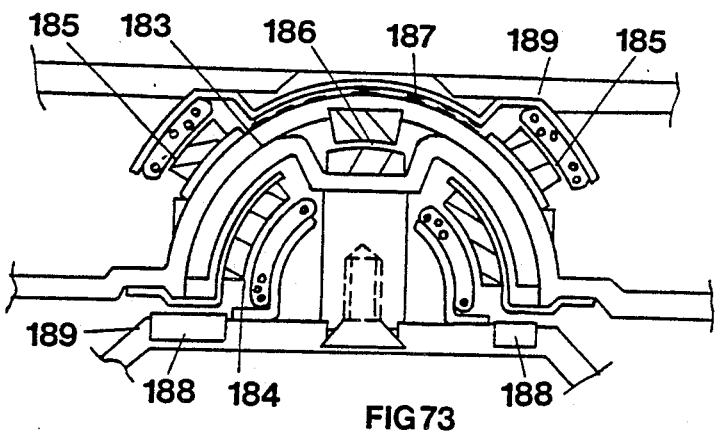
FIG. 73 shows essentially a halfsphere configuration with light rails, motor for rotation, voice coil for tracking and preload for air bearing.

FIG. 73 shows an air-bearing arrangement with a halfsphere combination 183, spinning motor 184 inside 183, lateral track or precession movers 185, or mover in other orthogonal direction and plane, preload magnets 186, light rails 187 for transmission of data, stops 188 and frame 189, for a few degrees of precession. Precession movers could also include actuated magnets where force is modified by altering the air gap, reluctance, force direction and others. Actuation can be push/pull or additive. Precession mover voice coil could be like a layered coil as in FIG. 66, or a one layered coil.

Figure 77:
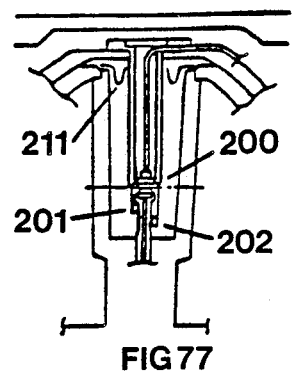
FIG. 77 shows a signal transmitter and power supply transmission close to center of rotation.

FIG. 77 shows, in principle, a transmitter 200 closest to center for least relative movement, also direct current power supply brushes 201 and 202. In general, only little direct current power is needed. Other methods include photo-voltaic transmission, inductive coupling, current minimum or zero current/voltage maximum like for coupling of frequency power sources and others. There is maybe only one transmitter/receiver and-/or assembly/disassembly of data and/or multiplex/-demultiplex at high data rate required. However, several could operate in parallel. A seal 211 may be needed.

Figure 80:
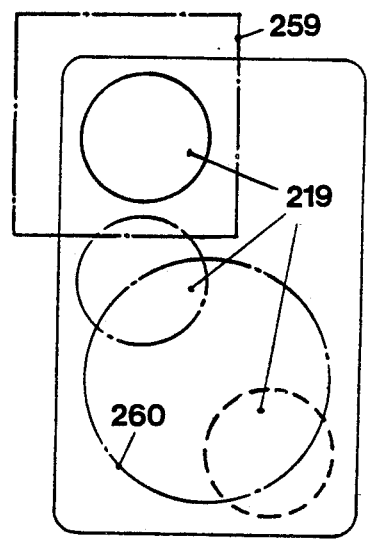
FIG. 80 shows a possible integration of media into a planar card.

FIG. 80 shows possible integration of media into a planar card. A potential footprint 259 is shown for an optical card reader/writer. A larger spherical media 260 is integrated into a planar card, while 219 are smaller media.

FIG. 81 shows an air-bearing implementation. A precession mover 222 is shown for continual tilt enveloping a cone. A unipolar magnet ring is stationary on the frame 230. A voice coil of limited circumferential lenght is attached to the moving part, free end 229. A pair of such moving voice coils opposite each other would allow servo operation in push/pull and/or additive mode. Adjacent pairs could provide symmetry. Voice coils are typically lined up with the center axis of the free end and multiple free ends will have their particular voice coils or voice coil sets accordingly.

Precession mover 224 is another implementation. Here, three evenly spaced voice coils interface with a magnetic ring to generate forces in the direction of precession. A multitude of coils can servo a particular position in order to align with a particular free end, of which there could be several. A full turn mover 223 is similar to a conventional DC motor allowing lateral, or here up/down, motion due to the spherical bearing. Precession mover 224 could be devised for inductive coupling for DC power transmission by splitting the magnet ring and interaction with voice coils radial legs. One coil and one magnet segment may suffice for low power operations. The transmission as such occurs with AC power. Under certain circumstances, both precession mover and inductive coupling might be on the same circumference.

A spherical registration 227 is shown to interface with media 228. Spherical registration is relatively insensitive to lateral registration tolerances as far as focus requirements are concerned. A constant distance of pivot to data surface of media is maintained. Servo operation can also eliminate rotation about axis X—X.

A platform as a free end 229 accommodates a multitude of heads and/or head arrays. A printed circuit board 231 is mounted on standoffs to frame 230. A constant radius type registration implementation 241 for a full turn mover is resting here on the bottom of frame 230 for alignment. The contact points, besides other locations, may be on the orthogonal sides of the media as well. A coil 232 of a set of three and a magnet ring 233 are shown in FIG. 81a for abovementioned precession mover.

FIG. 82 shows an arrangement with a spherical ball bearing, 234 shows a preload spring, 235 is a full turn mover, 236 is a precession mover and 237 is an inductive coupling.

FIG. 83 shows also a spherical ball bearing arrangement. Full turn mover 239 is assembled on the center portion of the bearing for compactness. Also shown are inductive coupling 238 and precession mover 240.

FIGS. 81, 82, 83, 84 and 85 all employ flat laminations for full turn mover. No flex leads are required.

Figure 84:
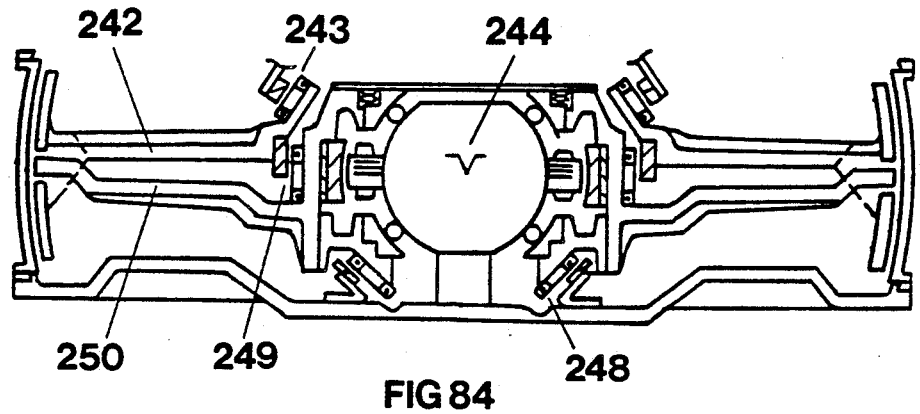
FIG. 84 shows additional free ends.

FIG. 84 shows arrangements with additional structure with free ends. A first structure 250 normally establishes an axis and/or provides reference information, but is not limited thereto. An additional structure 242 is movable relative to the media and/or the frame structure and moves in directions typically orthogonal to the full turn mover. Structures 242 and 250 track each other in circumferential direction by means of a spaced apart pivot arrangement 244, only one side of arrangement is shown. Relative movement between structures 242 and 250 is generated by precession mover 249. A mover could be arranged to generate relative movement between 242 and the frame reference. An inductive coupling 243 is also shown. Precession mover 248 provides relative movement between structure 250 and the frame. The precession mover 248 also employs a ring magnet which could also be segmented.

Figure 85:
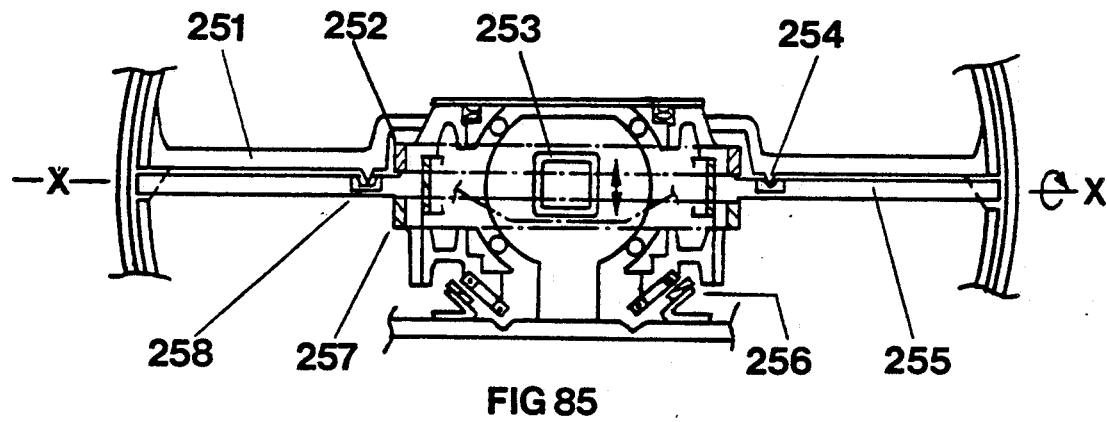
FIG. 85 shows a spaced apart pivot version and rotation about axis X—X for track access.
Figure 86:
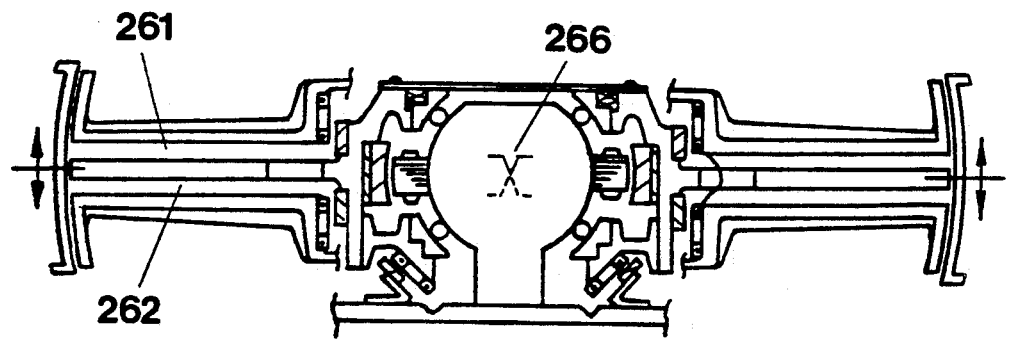
Figure 87:
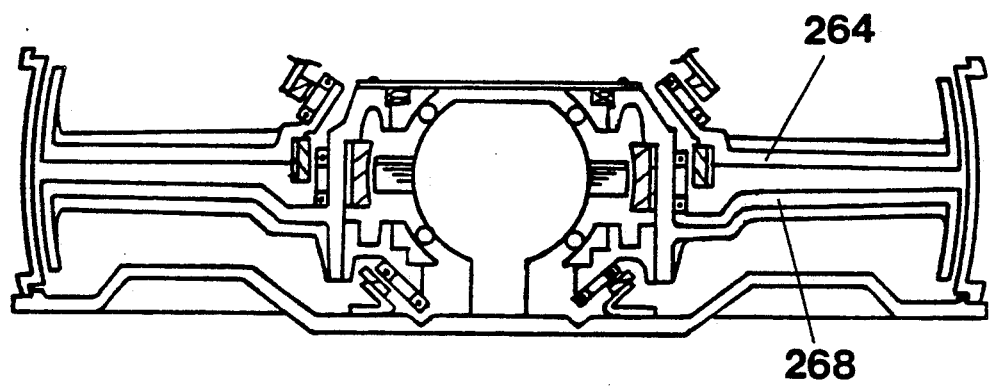

FIG. 85 shows an arrangement whereby a second structure 251 can be rotated about axis X—X of first structure 255 thus providing track accessing as well. Magnet rings 252 and 257 are interfacing with rotation mover coil 253 whereby two coil legs contribute to force generation. The use of only one ring and one coil leg would net about half the force. A spaced apart pivot arrangement 254 and 258 enables circumferential tracking of structure 251 with structure 255. Also to be noted is some elongation of pivot 258 devised to alleviate tolerance requirements. A view in the orthogonal direction would represent a V-groove. A precession mover arrangement 256 for structure 255 is also shown. Sheet-metal could also be used.

The spherical surface could be ontinous, segmented and/or also be removable by segment. The same voice coil, single pivot principle would be applied. Movers could be flat if precession is small. The air-bearing could be a self-acting design similar to a herringbone construction. Also being able to operate at higher speeds, air-bearings can produce less runout than ball bearing spindles. In an air-bearing system, it should be kept in mind that centrifugal forces will tend to throw the air towards the periphery or farthest away from the center of rotation. This phenomenon could be favorably utilized by preventing escapement or trapping the air so that a positive pressure could build up at the entrance of air to the bearing, see numeral 218, FIG. 78. Motor structure 212, FIG. 78 could prevent escapement of air if sealed at the mounting surface.

Figure 78:
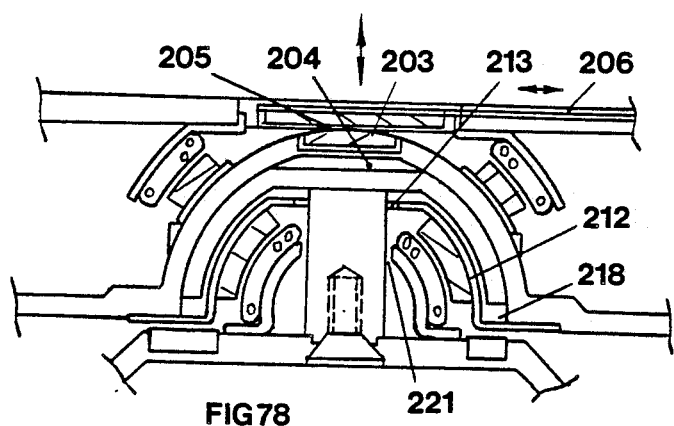
FIG. 78 shows in principle other air bearing starting aids by change of air gap and/or change of reluctance in turn changing magnet attraction.

Air entrance 213, FIG. 78, should be of the smallest radius possible for highest pressure build-up at entrance of air-bearing 218. Pressure build-up can also be enhanced by construction features aiding pumping action. These could be properly devised vanes, perhaps enclosed within a second surface and others. An air filter could be placed in the vicinity of 217, FIG. 74. It will be most efficient if overlapping occurs so that the air as lubrication means feeding the bearing gets filtered. The air at the clearance of the filter and structure 215 gets thrown away from said clearance thus providing a tortuous path for contaminants to enter.

The half-sphere could also be a partial sphere, meaning larger or smaller than a half-sphere of the pivot.

In FIG. 74, 215 shows an added escapement prevention structure or baffle, while 217 shows a filter, 216 shows an added partial sphere which could be actuated for preloading the air-bearing, while 214 has the same function as 213 of FIG. 78. The halfsphere, or less than a halfsphere, shape can be chosen for certain high quantity applications. Since there is no recess, forming and/or lapping or assembly operations are easier to accomplish. The free end could also be extended like a partially spherical platform to accommodate more than one functional head. More than one free end movable relative to each other could overlap to allow larger spacing of individual objective lens means and perhaps reduce bias due to centrifugal forces. Lens means could also be arranged in a tilted position versus axis Z—Z including individual tilt positions on the circumference if applicable. In highly integrated arrangements, several individual heads, or functional portions thereof, could be arranged in parallel.

In a first case the motor arrangement 184, FIGS. 73 and 190, FIG. 74 establishes a full turn rotation. The axis Z—Z, FIG. 75 is tilted in a plane generating two cross-over points on the periphery of the media. The major tracks are not parallel and/or continual. When employing several movers or mover pairs 185, FIG. 73, properly devised for this function, and/or smaller offsets and/or tilts, a relatively efficient system can be devised.

Only the several hundred tracks or so by one head unit at free end will be parallel, yet providing a useful system. Rotation about axis X—X has to be prevented and/or controlled for proper operation, particularly in certain applications. The direction of the rotation is, as example, along W—W for a particular track. See FIG. 43 for a free end or ends enveloping a halfsphere and forming a plane with the center of the pivot in the center of the plane.

A multitude of heads or head pairs can lower tilt-angle requirements. There are several possibilities of interlacing and/or interspersing tilts and/or offsets. In order to access a track or a major track location from which read and/or write means could access hundreds of tracks, the tilt position is stationary for that instance. The full turn mover could be devised with flat laminations if placed about axis X—X. Tilt may occur on one or more locations. The number of locations depends on the number of track cross-over locations on the media. A second case is similar to the first case, however, continual tilting enveloping a cone at the mover and also facing the media in reference to the pivot center will generate parallel tracks which are somewhat uneven in length depending on pivot to media distance and cylinder length. The tilt position is not stationary for traversing a track as in the first case, it is rather continually describing a circle while on track. The closer this tilt can describe a perfect circle as coarse positioning, the less the requirement for fine positioning will be. Both modes are present for track-following. A shifting reciprocal mass could be employed to aid balance. Instead of dedicated locations or tilt positions needing to be held stationary for instant track access thereof as in first case, an essentially analog system could be devised in order to access and maintain the vicinity of the targeted track.

The inertia will have a smoothing effect and helps circularizing the motion. The magnet of 185, FIG. 73, as in first case, may be a ring and a single or several overlays of coils can be properly devised to meet the requirement. See also FIG. 20 where a similar principle applies. Also applying for first case, the magnet could be circular and also be located on top of pivot, as in 205 of FIG. 78, and in the center of axis Z—Z.

In principle, the coils may have multiple overlays with angular offsets of coil arrangements like in FIG. 66. The free end will rotate in a direction for example as shown in FIG. 75, X1—X1. If an opening 221, FIG. 78, is provided, centrifugal forces will both establish higher pressure than ambient at location 218 and also provide air flow through the full-turn mover or motor-gap 184 of FIG. 73 establishing cooling action. A moving voice coil, attached to structure with free end, in line with head-arrays, interfacing to a ring magnet which is overlapped by the coil according to precession range, and generating precession movement, could be employed. In case of asymmetry and improper synchronization, besides others, a rotation about axis X—X could develop. This rotation has to be eliminated for certain applications. Inductive coupling can be implemented in a similar fashion, however, interfacing to preferably alternating magnetic fields. Depending on the amount of power to be coupled, only one or more segment, but no ring-magnet, may be required.

An array of moving voice coils, properly spaced on the periphery, could provide location servoing and a larger number of tilt positions and/or circumferential tilting, to be synchronized with full-turn mover. Use of permeable loops for magnetic flux will enhance force exertion. A controllable mass actuated in synchronization with precession movement could cancel torque exertion on frame in such direction. If of same momentum, two structures with free end could cancel such torques also. A third application has either a second pivot, effecting an operation like a spindle, or a finely tuned precession mover to establish an axis Z—Z, see FIG. 75. One or more heads or head pairs is placed on an additional structure which is coupled to the structure spinning around Z—Z. The coupling may also include an axis established by means of two spaced apart pivots. For spaced apart means, see FIG. 85, numerals 254 and 258.

A mover or mover pair will access a coarse track position. A coarse track position may include hundreds of actual tracks, which are typically from a fraction for short wavelength lasers or equivalent means, to somewhat more than a micron of width. The structure rotating about axis Z—Z is constrained along this axis. The implementation of the pivots establishing axis Z—Z could be a second spherical air-bearing, ball bearings, cylindrical air-bearings and others. A single sphere, particularly less than a halfsphere, allows easier thermal matching. The coupling means could be a gimbal, since the range of deflection is small. The free end of the first structure could provide feed-back for coarse servo and/or timing information. Both structures could also have symmetrical free ends with perhaps overlapping operating ranges. As can be seen, the establishment of a full-turn axis is a special case. It can be established by the single pivot means or also a second or additional pivot means. The term full-turn can have different meanings here. A movement parallel to line X1—X1 of FIG. 75 shows a full-turn movement, however, a cone denoted by lines V1—V1 is enveloped.

The diameter of the resulting circle is, however, somewhat smaller than the one shown for the first case. See also FIG. 43, line W—W for example, or also line V—V of FIG. 75. There, a fully extended circle is generated and the center of said circle is in the center of said circles plane.

In the same context, FIG. 42 is shown with two head pairs 63 which is arbitary. Heads could be paralleled on extensions of free ends or on additional free ends arranged in a direction parallel to axis Z—Z, see FIG. 75. Offsets for interlacing position of heads for contiguous track access by head switching, or accessing the beforementioned perhaps several hundred tracks, may be employed.

The motor means for the relative movement in between the two structures could be conventional voice coil means. The additional structure, however, could also be moved with mover means attached to static support structure, similar to implementation of precession and full turn movers.

Again, in order to eliminate a potential flex lead means, the permanent magnet should be arranged on the structure with the free end as is also the case for the precession and the full-turn mover. The design, however, has to take the relative movement of the magnet to the stationary voice coil arrangement into consideration. The voice coil could move against the static structure also, but it need not to. Besides others, again repelling or attracting magnets could be utilized. The movers could possibly be combined. This could be accomplished by appropriately devised overlays of coil arrangements generating the respective required magnetic fields for directional movement. In a simple version, a pin on top of the structure with the free end could be constrained by a sleeve 220 perhaps of polyimide as in FIG. 75. Repelling magnets could be used. Constraint means could be combined with precession mover means. Stops 188 of FIG. 73 are emergency stops. A bearing means could be employed at 214 of FIG. 74 or also at 213 of FIG. 78. Repelling/attracting magnets or magnetic field establishing means could interact.

A fourth case is similar to the third case, exept that there is no second mover for track accessing. A multitude of heads is placed on the free end means, the media can have the shape of a cylinder, perhaps segmented, with a partially spherical surface, or the shape of an internal cylinder. See also under "a media with at least one straight line". The arrangement is comparable in function to Fixed Head Winchesters. This is a rare application, uneconomical since many heads are used, but providing very high throughput since besides latency, only head switching times, rather than track access times, are present.

The merits of the application for the fourth case is, however, greatly enhanced since approaching a few hundred tracks or so could be accessed by a single head. Also here, a finely tuned precession mover could establish an axis for the pivot as well. Initial constraint should perhaps be provided. A fifth case is similar to the fourth case, except that there is no constraint for axis Z—Z. A mover means can provide access movement along axis Z—Z utilizing less heads, or even a single head in contrast to the fourth case. The shape of the media would be an internal cylinder, which could also be segmented, however, having less mechanical strength and integrity than spherical media. Again, a finely tuned precession mover could be utilized. Constraints to limit initial movements may be required.

A sixth case would be the rotation about axis X—X, see FIG. 85 for one implementation. The individual head and/or objective lens means could be spaced at incrementing distance from the center. For other applications, however, this rotation needs to be prevented if not functional. FIG. 85 shows an application where this rotation is intended, and an added head pair at 90° with free ends for operation limited to center portion of media would yield low inertia. In a seventh case a media in the shape of a partial circular torus can be turned about an axis. A pivot actuator can interface to the media whereby either circumferential tracks are accessed by staying on the same track while the media spins, or by making nutating movements in the radial direction while the media will turn typically slower.

Overall, similar conditions also exist for example for operation with tape, such as "Digital Tape". Among other applications are tape drives and printer/scanners and/or combinations of them including storage devices. Potential implementations of a beforementioned case are FIGS. 1, 39 and 49 as partially explained before. The media is in the shape of a partial sphere, but does not comprise a cylinder like preferably perhaps in abovementioned cases, however, where no complete, possibly segmented, cylinder is required.

A second free end can be placed opposite a first free end or the vicinity thereof, interfacing with a second media 143e/143f, FIG. 52. If continued for more media segments, great resemblance would exist for example to the first through fifth cases.

However, the movements of the head is intended to be confined to a particular media piece, and/or a few segments, only. This also means that relatively simple and/or economical pivots have to be devised only. The movement can also describe a circle on the media and envelop a cone besides nutating, or back and forth, motion or other curves. Offsets can be generated by moving extended or enlarged free ends or media to different positions. Distributed rail means or other protruding projections may provide resting points. The pivot assembly as a whole may be lifted slightly to facilitate this operation while traversing the media. Said free end could also rest directly on the data surface depending on duty cycle, surface conditions and other considerations.

Offsets could be to particular media spots as well as to smaller spheres within a larger sphere. Also, spheres within otherwise flat surfaces, one of these applications being the well known and publicized planar card among many other possible configurations. These features might, however, find application in at least some of the other cases also. Here, however, other pivot means than genuine air-bearings would most likely be used.

On the other hand, besides making contact for an instant, a floating bearing and/or also contact-recording could be utilized. The term "adjacent" shall also include contact-recording. "Adjacent" may also mean a few millimeters depending on optics. The term "interfacing" shall comprise all the possible operations between free end and media. Examples are the free end traversing the media, a beam, either light or other electro-magnetic waves, ions, electrons or similar, hitting or perhaps refecting off media, magnetic flux fields be imparted or sensed from media and/or contacting while traversing and the like, including data exchange.

In the case of perhaps very high areal bit densities, the media may move and read and/or record means, which as a term will also include potential erase means, or portions of read and/or record means, could be located opposite the media and possibly be connected to the structure with the free end. Since the media can also be removable, registration means contact points are most favorably located farthest away from the center and on the periphery. This assures very favorable conditions when compared to flat media to be registered on a hub, where tolerance errors or perhaps a piece of lint will be greatly magnified when translated to the periphery of the media. This will also reduce the required focusing range down to a small fraction versus conventional approaches as of today. Thermal matching of structures will have the same effect.

In the same context, it is desirable to translate a four corner contact point arrangement of the media, as for example shown in FIG. 1, into a three point registration means on the support structure. This can be accomplished perhaps by bar-like means supported near the center of the bar while the ends of the bar are contacting two points of the media registration arrangement. The arrangements would accommodate for manufacturing tolerances of media as well as registration means of support structure. This assures repeatability of media on insertion/removal with a particular unit since focus conditions can be stored and modeled into memory assuring a three point contact for definite position registration. In larger system, a small peristaltic pump could provide air pressure for starting to be pumped perhaps into upper cavity 204 of FIG. 78, if needed.

FIG. 78 shows an air-bearing preload magnet pair 203 starting aid which can be facilitated through enlargement of air gap 205 by lifting upper magnet perhaps via lever and solenoid or by changing the reluctance by shifting of permeable material 206. A pressurized air-bearing could be used also. The bearing surfaces could be coated with the newer economical diamond like surface treatment processes or other air-bearing compatible materials. Inserts are a possibility. Besides being spherical, the voice coil and/or magnet or mover means may have preferably a rounded shape, depending on precession range, and the magnet and wiring arrangement will be more like a conventional motor. Flat laminations could be used also for mover parallel to axis X—X. A floating mass on either the housing and/or support means and/or the structure with the free end could be employed. A member movable in compensating direction may be employed. Such member could also be arranged on the frame in order to cancel precession torque for the system.

While several embodiments in accordance with the present invention are shown, it is understood that the same is not limited thereto but is susceptible of numerous changes and modifications as known to those skilled in the art and the inventor therefore does not wish to be limited to the details shown and described herein.

Instead of a magnetic means a second coil could be employed for either establishing magnetic flux or magnetization if used with or without permeable means to establish a magnetic field. Second coil may be current controlled simultaneously with first coil. Additionally, the (1-COS) element of the present invention could be mounted on a head arm for a floppy or hard disk, coupled to a standard magnetic head. Magnetic recording may find use with contact-recording or a floating/flying perhaps nondirectional magnetic head perhaps including optical means.

Any combination may be devised from a choice of printer, character reader, scanner, data storage/retrieval including tape and the like, but not limited to. In general, the actuator or apparatus can be integrated or be modular with other functional apparatus such as telephones, cellular phones, portable computers, car dashboard, fax machines, cameras and many others either singularly or in combinations of several functional apparatus.

It should be understood that a vast base of technology is in the public domain which could be utilized with the present invention.

This patent application could not reasonably cover and mention all of these references, however, it shall be understood that it be included into the scope of this patent.

What is claimed is:

1. An actuator for data retrieval and/or storage with media means comprising;
   structure for supporting at least a portion of read and/or record means, said structure having free end for placement adjacent to media means;
   pivot means coupled to said structure for allowing relative movement between said structure and said pivot means in at least two orthogonal directions or components thereof, such that said free end can move relative to and essentially along a portion of a sphere in at least two planes; and
   means for moving said structure and said pivot means relative to each other.

2. The actuator of claim 1, and including means for balancing the structure relative to said pivot means.

3. The actuator of claim 2, wherein said balance means includes magnetic means operable by varying an air gap distance from a magnet to a permeable structure.

4. In a data retrieval and/or storage system:
   a support structure;
   means on the support structure for registration of media, said media having a data storage surface;
   an elongated structure with a free end;
   means coupling the structure with free end to the support structure for pivotal movement about any one of a number of pivot axes extending through the coupling means and perpendicular to the longitudinal axis of the structure with free end, the free end of the structure being adjacent to and movable along the data storage surface of the media when the media is registered on the support structure; and
   means coupled with the support structure and the structure with free end for moving the support structure and the structure with free end relative to each other, whereby a read and/or record means or portion thereof on the free end of the structure is moved in data retrieval and/or storage relationship to the data storage surface of the media.

5. The system of claim 4, including media means for retrieval and/or storage of data.

6. A method for retrieval and/or storage of data comprising:
   providing a read and/or record means or part thereof adjacent to a media having essentially a partially spherical data surface; and
   moving at least a portion of said means along said data surface in any one of a number of directions and in data retrieval and/or storage relationship thereto.

7. The method of claim 6, wherein said media data surface has at least one straight linear line.

8. The actuator of claim 1, wherein said pivot means includes support structure, the structure with free end being movable and the support structure being stationary.

9. The actuator of claim 1, wherein said pivot means includes support structure, wherein the structure with free end is stationary and the support structure is movable.

10. An actuator for a read and/or record means comprising:
structure for supporting at least a portion of said read and/or record means, said structure having a first, free end for placement adjacent to a media;
pivot means coupled to a second end of said structure opposite said first end for allowing relative movement between said structure and the pivot means essentially about a single point; and
means for moving said structure and said pivot means relative to each other.

11. The actuator of claim 1, further comprising at least a second structure means with free end coupled to said pivot means opposite to said structure with free end, the free end of the second structure being adapted for interacting with at least a second media.

12. An actuator for optical read and/or record means interfacing with media comprising:
elongate structure for supporting said means thereon, said structure having a first free end;
pivot means coupled to a second end of said structure opposite said first end for supporting said structure and allowing at least partial movement of said structure essentially about a single point;
mover means coupled to said structure between said free end and approximate said pivot means, said mover means being attached to said structure and being curved so that all points of said mover means are essentially equidistant from a pivot point of said pivot means, said mover means including a voice coil, a projection of said voice coil onto a plane normal to axis of said arm between said first and second ends of said structure being essentially a parallelogram or portion thereof, at least one magnet interacting with said coil to cause movement of magnet and said coil relative to each other, said magnet being shaped to allow passage of said coil as said structure is moved;
an objective lens of said optical read and/or record means mounted approximate said first end of said structure;
a photoemitter and photodetector and an optional beam control element included in said optical means mounted in such structure between said pivot means and said first end;
at least one focus and tracking means being integrated approximate a midpoint of said structure;
means for coupling said focus and said tracking means to said beam control element; and
said objective lens interfacing with a media for retrieving and/or storing data, said media having an exposed concave surface with the shape of a portion of a sphere proximate said first end of said arm, said sphere having a center point at said pivot point.

13. The actuator as set forth in claim 1, wherein is included "offset means" to access separate segments on the media.

14. The actuator of claim 1, and including read and/or record means at least partially coupled with the structure with free end.

15. The actuator of claim 14, wherein said read and/or record means are optical means.

16. The actuator of claim 14, said read and/or record means including an objective lens means proximate the free end of said stucture.

17. The actuator of claim 16, including a beam means coupled to the structure.

18. The actuator of claim 14, wherein said read and/or record means are "multifunctional".

19. The actuator of claim 14, wherein a movable focus and/or tracking structure is attached between said free end of said structure with free end and a pivot point of said structure with free end, means for moving said focus and/or tracking structure relative to said structure with free end, and means for coupling said movable focus and/or tracking structure to a beam control element.

20. The actuator of claim 19, wherein a given movement of said movable focus and/or tracking structure causes a smaller movement of said beam control element.

21. The actuator of claim 1, wherein mover means includes including magnetic means defining said mover means.

22. An actuator as set forth in claim 16, wherein said objective lens has means to permit several beams to pass therethrough simultaneously.

23. An actuator as set forth in claim 14, including at least one laser means.

24. An actuator as set forth in claim 15, wherein said read and/or record means includes integrated optics and/or electro-optics.

25. The actuator as set forth in claim 14, wherein rotation of structure with free end accommodates variations in track spacing.

26. The actuator as set forth in claim 19, wherein the mover means for focus and tracking are piezoelectric means.

27. The actuator as set forth in claim 1, including means for moving coupling to support structure and structure with free end causing relative movement between each other.

28. The actuator of claim 1, wherein said mover means includes a voice coil and magnetic means, the voice coil being attached to the structure with free end and the magnet being attached to the support structure.

29. The actuator of claim 1, wherein said mover means includes a voice coil and magnetic means, said magnet attached to the structure with free end and the voice coil being attached to the support structure.

30. The actuator of claim 1, wherein the mover means includes at least one voice coil with one active coil area attached in the center of the structure with free end.

31. The actuator of claim 27, wherein said mover means include at least one individual coil generating at least one force component.

32. The actuator of claim 1, wherein the mover means includes two individual, superimposed coils to generate two force components which may be essentially orthogonal and/or of equal magnitude.

33. Tha actuator of claim 32, wherein said force components are not orthogonal and/or of unequal magnitudes.

34. The actuator of claim 1, wherein the location of said mover means on the structure with free end is essentially in the center of percussion of the structure with free end.

35. The actuator of claim 1, wherein the pivot means couples to a support structure and structure with free end enabling relative movement between each other.

36. The actuator of claim 35, wherein the pivot means includes preload means.

37. The actuator of claim 36, wherein said preload means includes spring means.

38. The actuator of claim 36, wherein said preload means includes magnetic means.

39. The actuator of claim 38, wherein said preload means includes magnets of the same polarity.

40. The actuator of claim 39, wherein said magnets are of opposing polarity.

41. The actuator of claim 35, wherein the pivot means includes at least one member including plastic means.

42. The actuator of claim 35, wherein the pivot means includes at least one member including metallic means.

43. The actuator of claim 35, lubrication means.

44. The actuator of claim 35, including magnetic means and/or superconductive means for suspension.

45. The actuator of claim 1, including stop means to prevent permanent separation of the structure with free end from the pivot means.

46. The actuator of claim 1, including means to prevent rotation of the structure with free end around its own axis.

47. The actuator of claim 46, wherein said preventing means includes additional coil for voice coil arrangement.

48. The actuator of claim 46, wherein said preventing means includes a flexible ring or portion thereof devised for lowest bias force for pivot and least circumferential deflection.

49. The actuator of claim 1, wherein said pivot means includes support structure for establishing a distance relationship between the media means and pivot means.

50. The actuator of claim 49, wherein said support structure also has means to register the media in reference to the pivot means.

51. The actuator of claim 49, wherein said registration means allows for registration of different shapes of media.

52. The actuator of claim 49, wherein said registration means allows for registration of different sizes of media.

53. The actuator of claim 49, at least one second structure with free end and at least one second media, the second structure and the second media being supported by said support structure.

54. The actuator of claim 49, wherein said support structure is essentially a housing.

55. The actuator of claim 50, wherein said means to register includes three contact surfaces with three transverse contact surfaces.

56. The actuator of claim 55, wherein said means to register provides a stop to prevent permanent separation of media and registration means.

57. The actuator of claim 1, wherein is included support structure, said structure with free end being thermally matched with said support structure for minimizing focus and tracking requirements by use of materials of similar coefficients of thermal expansion.

58. An actuator as set forth in claim 1, wherein said pivot means includes an air bearing.

59. An actuator as set forth in claim 1, wherein said pivot means includes a bendable pivot.

60. An actuator as set forth in claim 27, wherein repel forces are used for motion reversal.

61. The actuator of claim 58, wherein the air bearing has essentially the shape of a half-sphere.

62. The actuator of claim 35 wherein said pivot means includes essentially ball bearing means.

63. The actuator of claim 46, wherein the means to prevent rotation about the axis of the structure with the free end includes coil-offset means.

64. The actuator of claim 58, wherein said air bearing is self acting.

65. The actuator of claim 14, including periscope optics means.

66. The actuator of claim 16, wherein the objective lens means is integrated with fiberoptic waveguide means.

67. The actuator of claim 47, including at least one additional voice-coil means with offset.

68. An actuator for data retrieval and/or storage with media means comprising:
   structure for supporting at least a portion of read and/or record means, said structure having free end for interfacing with media means;
   pivot means coupled to said structure for allowing relative movement between said structure and said pivot means in at least two orthogonal directions or components thereof, such that said free end can move relative to and along a portion of a sphere in at least two planes; and
   means for moving said structure and said pivot means relative to each other.

69. In a data retrieval and/or storage system:
   a support structure;
   means on the support structure for registration of media, said media having a data storage surface;
   an elongated structure with a free end;
   means coupling the structure with free end to the support structure for pivotal movement about any one of a number of pivot <axis> axes extending through the coupling means and perpendicular to the longitudinal axis of the structure with the free end, the free end of the structure interfacing to and movable along the data storage surface of the media when the media is registered on the support structure; and
   means coupled with the support structure and the structure with the free end for moving the support structure and the structure with the free end relative to each other, whereby a read and/or record means or portion thereof on the free end of the structure is moved in data retrieval and/or storage relationship to the data storage surface of the media.

70. Actuator for data storage and/or retrieval with a media means comprising:
   mover means for moving a structure with a free end, supporting at least a portion of a read and/or record means, and a support structure relative to each other;
   pivot means coupling said structures allowing movement about a single point and allowing movement of said free end of said structure with free end relative to said data surface of said media for data storage and/or retrieval relationship with each other.

71. The actuator of claim 58, wherein the air bearing has the shape of a partial sphere.

72. The actuator of claim 68, wherein said pivot means includes two spaced apart pivot means forming an axis allowing partial turn rotation.

73. The actuator of claim 50, having a translation means for translating four registration points of media means into three registration points at registration means of support structure.

74. The actuator of claim 49, wherein said distance relationship allows for constant distance between said pivot means and any location on a data surface of said media.

75. The actuator of claim 14, wherein rotation of structure with free end accommodates alignment of Kerr-angle in relationship to read and/or record means.

76. The actuator of claim 72, wherein the location of the mover means is on the opposite side of the pivot from the structure with the free end.

77. The actuator of claim 58, air entrapment means establishing air pressure higher than ambient at entrance of air bearing.

78. The actuator of claim 2, including means for a balancing mass, wherein said mass is controllable to cancel precession torque on said support structure.

79. The actuator of claim 24, wherein said read and/or record means include acousto-optic means.

80. The actuator of claim 24, wherein said read and/or record means includes surface emitting laser means.

81. The actuator of claim 62 wherein said ball bearing means are essentially spherical ball bearing means.

82. A media means having a data surface with the shape of a portion of a shpere and means for providing data storage and/or retrieval with said data surface allowing a pivot location proximate said sphere to be optional, wherein the radius of said sphere extends from the center point of the pivot means to the spherical surface of the media.

83. An actuator for data retrieval and/or storage with a media means comprising:
 structure for supporting at least a portion of read and/or record means, said structure having free end for interfacing to said media means;
 pivot means coupled to said structure with free end for allowing relative movement between said structure and said pivot means in at least two orthogonal directions or components thereof, such that free end can move relative to and along a portion of a sphere in at least two planes, allowing at least a full turn rotation in one of said orthogonal directions and said free end to describe a circle whereby said pivots center point is in the center of said circles plane; and
 means for moving said structure and said pivot means relative to each other.

84. The media of claim 82, wherein the media means has a curved data surface.

85. The media of claim 82, wherein the media means has a data surface including multifunctional properties.

86. The media of claim 82, wherein the media means has at least one data surface which is integrated in a planar card.

87. The media of claim 82, wherein is included at least one additional data surface on the opposite side of the media.

88. The media of claim 82, and including an enclosure to protect said media, said enclosure having means to allow insertion or removal of said media to and from the enclosure.

89. The actuator of claim 83, a mover means for movement of at least a full turn rotation in at least two planes.

90. The actuator of claim 83, at least one mover means for movement in the other of said orthogonal directions.

91. The actuator of claim 90, wherein said mover means includes at least one voice-coil and magnet.

92. The actuator of claim 83, wherein mover assembly for both orthogonal directions are integrated into essentially one mover means.

93. The actuator of claim 89, wherein mover means for said full turn rotation is placed essentially inside sphere of air bearing means.

94. The actuator of claim 58, with a controllable balance means.

95. The actuator of claim 83, wherein structure with free end has centrifugal pump facility.

96. The actuator of claim 89, a mover means for confining movement of said full turn rotation about an axis.

97. The actuator of claim 96, wherein said axis is established by a second pivot means spaced apart from first pivot means.

98. The actuator of claim 89, including a second structure with a free end coupled to a first structure coupled to said pivot means by a second pivot means.

99. The actuator of claim 98, wherein said coupling includes two spaced apart pivot means allowing partial rotation about an axis.

100. The actuator of claim 90, wherein said mover means allows movement along a circumference enveloping a cone in reference to said pivot center.

101. The actuator of claim 100, wherein said mover means confines movement about an axis only.

102. The actuator of claim 100, wherein said mover means allows movement to establish dedicated tilt positions in reference to an axis.

103. The media of claim 97, wherein the media means has a data surface in the shape of a partial circular torus.

104. The actuator of claim 36, wherein said preload means is controllable.

105. The actuator of claim 89, wherein said full turn mover is located about a plane of said pivot and said mover having members, one of said members including flat lamination means.

106. The actuator of claim 98, allowing said second structure with free end to rotate about an axis passing through center of free end of said structure with free end and through center of said pivot means.

107. The actuator of claim 106, wherein the axis of rotation is orthogonal and in the same plane to said axis of rotation.

108. The actuator of claim 98, at least one additional structure with a free end.

109. The media of claim 97, wherein the media means has at least one data surface with the shape of a portion of a sphere.

110. The actuator of claim 90, rotation prevention means about an axis established by the centers of said free end and said pivot means.

111. The actuator of claim 82, insertion/removal means for media allowing insertion/removal while free end of structure with free end is moving.

* * * * *